(12) United States Patent
Yudanov et al.

(10) Patent No.: US 12,737,602 B2
(45) **Date of Patent: *Sep. 15, 2026**

(54) PERFORMING PROCESSING-IN-MEMORY OPERATIONS RELATED TO SPIKING EVENTS, AND RELATED METHODS, SYSTEMS AND DEVICES

(71) Applicant: Micron Technology, Inc., Boise, ID (US)

(72) Inventors: Dmitri Yudanov, Cordova, CA (US); Sean S. Eilert, Penryn, CA (US); Hernan A. Castro, Shingle Springs, CA (US); Ameen D. Akel, Rancho Cordova, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/582,467

(22) Filed: Feb. 20, 2024

(65) Prior Publication Data

US 2024/0232601 A1 Jul. 11, 2024

Related U.S. Application Data

(63) Continuation of application No. 16/887,665, filed on May 29, 2020, now Pat. No. 11,915,124.

(Continued)

(51) Int. Cl.
*G06F 12/06* (2006.01)
*G06N 3/04* (2023.01)

(Continued)

(52) U.S. Cl.
CPC ......... *G06N 3/063* (2013.01); *G06F 12/0646* (2013.01); *G06N 3/04* (2013.01); *G06F 2212/1008* (2013.01)

(58) Field of Classification Search
CPC ............. G06N 3/08; G06N 3/04; G06N 3/049
See application file for complete search history.

(56) References Cited

U.S. PATENT DOCUMENTS 9,653,127 B1 5/2017 Mantegazza et al.
10,416,927 B2 9/2019 Lea et al.

(Continued)

FOREIGN PATENT DOCUMENTS

CN 103052963 A 4/2013
CN 110121722 A 8/2019

(Continued)

OTHER PUBLICATIONS

Byung-Do Yang, "A Low-Power SRAM Using Bit-Line Charge-Recycling for Read and Write Operations", Oct. 2010, IEEE Journal of Solid-State Circuits, vol. 45 No. 10, pp. 2173-2183 (Year: 2010).

(Continued)

*Primary Examiner* — Getente A Yimer
(74) *Attorney, Agent, or Firm* — TraskBritt

(57) ABSTRACT

Methods, apparatuses, and systems for in- or near-memory processing are described. Spiking events in a spiking neural network may be processed via a memory system. A memory system may store a group of destination neurons, and at each time interval in a series of time intervals of a spiking neural network (SNN), pass through a group of pre-synaptic spike events from respective source neurons, wherein the group of pre-synaptic spike events are subsequently stored in memory.

18 Claims, 11 Drawing Sheets

Related U.S. Application Data

(60) Provisional application No. 62/896,261, filed on Sep. 5, 2019.

(51) Int. Cl.

| | |
|---|---|
| ***G06N 3/049*** | (2023.01) |
| ***G06N 3/0495*** | (2023.01) |
| ***G06N 3/063*** | (2023.01) |
| ***G06N 3/065*** | (2023.01) |
| ***G06N 3/084*** | (2023.01) |
| ***G06N 3/088*** | (2023.01) |

(56) References Cited

U.S. PATENT DOCUMENTS

| | | | | |
|---|---|---|---|---|
| 10,521,714 | B2 | 12/2019 | Esser et al. | |
| 2012/0036099 | A1 | 2/2012 | Venkatraman et al. | |
| 2012/0173471 | A1 | 7/2012 | Ananthanarayanan et al. | |
| 2012/0259804 | A1 | 10/2012 | Brezzo et al. | |
| 2014/0129498 | A1 | 5/2014 | Bichler et al. | |
| 2015/0039547 | A1 | 2/2015 | Kang et al. | |
| 2015/0278685 | A1 | 10/2015 | Zheng et al. | |
| 2016/0125287 | A1 | 5/2016 | Pantazi et al. | |
| 2016/0155047 | A1* | 6/2016 | Esser | G06F 9/44505 706/29 |
| 2016/0364644 | A1 | 12/2016 | Brothers et al. | |
| 2017/0017879 | A1 | 1/2017 | Kataeva et al. | |
| 2018/0082176 | A1 | 3/2018 | Wu et al. | |
| 2018/0107922 | A1 | 4/2018 | Paul et al. | |
| 2018/0174028 | A1 | 6/2018 | Lin et al. | |
| 2018/0174040 | A1 | 6/2018 | Davies et al. | |
| 2018/0174042 | A1* | 6/2018 | Srinivasa | G06N 3/088 |
| 2018/0189646 | A1 | 7/2018 | Kumar et al. | |
| 2018/0225562 | A1* | 8/2018 | van der Made | G06N 3/063 |
| 2018/0260696 | A1 | 9/2018 | Suda et al. | |
| 2018/0322384 | A1* | 11/2018 | Augustine | G06N 3/049 |
| 2019/0005376 | A1 | 1/2019 | Akin et al. | |
| 2019/0042909 | A1* | 2/2019 | Sumbul | G06N 3/08 |
| 2019/0228295 | A1 | 7/2019 | Yasuda et al. | |
| 2019/0303740 | A1 | 10/2019 | Arthur et al. | |
| 2019/0385704 | A1 | 12/2019 | Oster | |
| 2021/0004174 | A1 | 1/2021 | Boniardi et al. | |
| 2021/0073622 | A1* | 3/2021 | Yudanov | G06N 3/063 |

FOREIGN PATENT DOCUMENTS

| | | | |
|---|---|---|---|
| TW | 201539335 | A | 10/2015 |
| WO | 2019/125421 | A1 | 6/2019 |

OTHER PUBLICATIONS

European Extended Search Report and Opinion for European Application No. 20861140.0, dated Jun. 7, 2023, 9 pages.

Guo et al., "Unsupervised Learning on Resistive Memory Array Based Spiking Neural Networks", Frontiers in Neuroscience, vol. 13, Article 812, Aug. 2019, 16 pages.

International Search Report for Application No. PCT/US2020/070454, mailed Nov. 27, 2020, 3 pages.

Kornijcuk et al., " Pointer Based Routing Scheme for On-chip Learning in Neuromorphic Systems", 2018 International Joint Conference on Neural Networks (IJCNN), Jul. 13, 2018, sections 2-3.

Kornijcuk et al., "Reconfigurable Spike Routing Architectures for On-Chip Local Learning in Neuromorphic Systems", Advanced Materials Technologies—Advanced Intelligent Systems, vol. 4, No. 1, Oct. 15, 2018, pp. 2-4, 12: and figures 1c, 3a.

Sparsh Mittal, "A Survey of Re Ram-Based Architectures for Processing-In-Memory and Neural Networks", Apr. 30, 2018, Machine Learning and Knowledge Extraction, pp. 75-112. (Year: 2018).

Written Opinion of the International Searching Authority for Application No. PCT/US2020/070454, mailed Nov. 27, 2020, 5 pages.

Yudanov et al., "GPU-Based Simulation Neural Networks with Real-Time Performance & High Accuracy", The 2010 International Joint Conference on Neural Networks (IJCNN), IEEE, Jul. 18, 2010, 8 pages.

Yudanov et al., U.S. Appl. No. 16/717,890, Nanowire Zero-Capacitor DRAM Transistors with and without Junctions90 titled Methods for Performing Processing-In-Memory Operations on Serially Allocated Data, and Related Memory Devices and Systems filed Dec. 17, 2019.

Chinese First Office Action for Chinese Application No. 202080062712.X, dated Aug. 15, 2024, 26 pages with translation.

Chinese Second Office Action for Chinese Application No. 202080062712.X, dated Dec. 28, 2024, 25 pages with translation.

Korean Notice of Reasons for Rejection for Korean Application No. 10-2022-7010817, dated Mar. 24, 2025, 15 pages with English translation.

European Communication pursuant to Article 94(3) EPC for European Application No. 20861140.0, dated Jan. 12, 2026, 6 pages.

Korean Notice of Allowance for Korean Application No. 10-2022-7010817, dated Nov. 24, 2025, 5 pages with English translation.

* cited by examiner

900

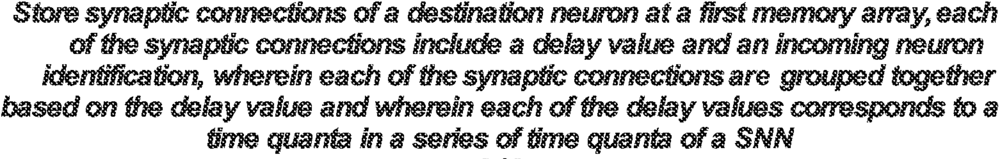

Store pre-synaptic spike events from respective source neurons at a second memory array, wherein each number of pre-synaptic spike events includes an incoming neuron identification, and the number of pre-synaptic spike events are grouped together by the time quanta in a series of time quanta of the SNN
920

Match the incoming neuron identifications of the synaptic connections of the destination neuron with the incoming neuron identification of the source neurons at a first time quanta
930

In response to the matching, generate an output signal, at the second memory array, corresponding to a bitmask of synaptic events
940

FIG. 9

PERFORMING PROCESSING-IN-MEMORY OPERATIONS RELATED TO SPIKING EVENTS, AND RELATED METHODS, SYSTEMS AND DEVICES

CROSS-REFERENCE TO RELATED APPLICATION

This application is a continuation of U.S. patent application Ser. No. 16/887,665, filed May 29, 2020, now U.S. Pat. No. 11,915,124, issued on Feb. 27, 2024, which claims the benefit under 35 U.S.C. § 119(e) of U.S. Provisional Patent Application Ser. No. 62/896,261, filed Sep. 5, 2019, the disclosure of each of which is hereby incorporated herein in its entirety by this reference.

TECHNICAL FIELD

Embodiments of the disclosure relate to processing-in-memory and, more specifically, to performing processing-in-memory (PIM) operations related to spiking events of a spiking neural network (SNN). Yet more specifically, some embodiments relate to methods for performing PIM operations within a processing-in-memory capable memory device related to spiking events in a SNN, and related memory devices, memory systems, and electronic systems.

BACKGROUND

Memory devices are typically provided as internal, semiconductor-based, integrated circuits in computers or other electronic systems. There are many different types of memory including volatile and non-volatile memory. Volatile memory, which may retrieve stored information after being power cycled, may include, among others, flash memory including NAND or NOR flash memories. Volatile memory may require power to maintain its data (e.g., host data, error data, etc.) and includes random-access memory (RAM), dynamic random-access memory (DRAM), static random-access memory (SRAM), synchronous dynamic random-access memory (SDRAM), content-addressable memory (CAM), and thyristor random-access memory (TRAM), among others.

Electronic systems often include a number of processing resources (e.g., one or more processors), which may retrieve and execute instructions and store the results of the executed instructions to a suitable location. A processor may include a number of functional units such as arithmetic logic unit (ALU) circuitry, floating point unit (FPU) circuitry, and a combinatorial logic block, for example, which may be used to execute instructions by performing an operation on data (e.g., one or more operands). As used herein, an operation may include, for example, a Boolean operation, such as AND, OR, NOT, NOT, NAND, NOR, and XOR, and/or other operations (e.g., invert, shift, arithmetic, statistics, among many other possible operations). For example, functional unit circuitry may be used to perform the arithmetic operations, such as addition, subtraction, multiplication, and division on operands, via a number of operations.

A number of components in an electronic system may be involved in providing instructions to the functional unit circuitry for execution. The instructions may be executed, for instance, by a processing resource such as a controller and/or host processor. Data (e.g., the data on which the instructions may be executed) may be stored in a memory array that is accessible by the functional unit circuitry. The instructions and/or data may be retrieved from the memory array and sequenced and/or buffered before the functional unit circuitry begins to execute instructions on the data.

In many instances, processing resources (e.g., processor and associated functional unit circuitry) may be external to the memory array, and data is accessed via a bus between the processing resources and the memory array to execute a set of instructions. Processing performance may be improved in a processor-in-memory (PIM) device, in which a processor may be implemented internally and/or near to a memory (e.g., directly on a same chip as the memory array). A PIM device may save time and/or conserver power by reducing and eliminating external communications.

BRIEF DESCRIPTION OF THE DRAWINGS

FIG. 9 is a flowchart of another example method of processing-in-memory spiking events, in accordance with various embodiments of the present disclosure.

DETAILED DESCRIPTION

Figure 1:
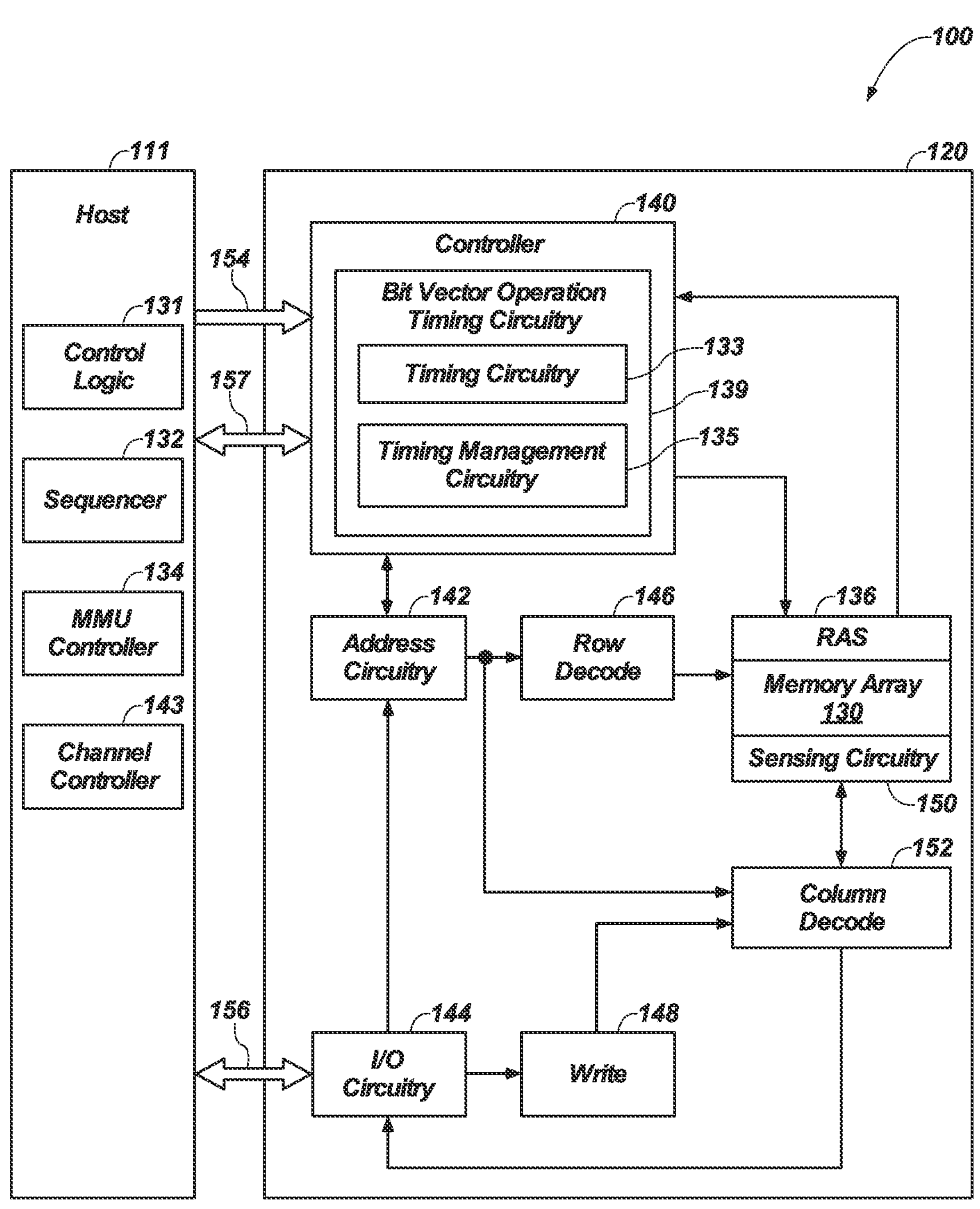
FIG. 1 is a block diagram of a system including a memory device, in accordance with a number of embodiments of the present disclosure.

Processing spiking events in a spiking neural network (SNN) is used in many applications, such as in machine learning, image processing, artificial intelligence, system modeling (e.g., electrical systems, mechanical systems, etc.), brain-computer interface, large-scale brain simulations, robotics, control systems, and many others. The PIM operations to process spiking events (e.g., pre-synaptic events, synaptic events) may be relatively simple (e.g., filtering, matching, and accumulating). However, conventional computer-based computations may involve processor- and memory-intensive operations, including transferring large amounts of data between compute cores and memory arrays.

Various embodiments of the disclosure relate to processing-in-memory (PIM) operations, and more specifically to performing PIM operations to process spiking events in a SNN. In one embodiment, a memory system includes a block of memory. The memory is configured to store data corresponding to a group of destination neurons and a spike signal filter configured to, at each time interval (also referred to herein as a "time quanta") in a series of time intervals of a SNN, pass through data corresponding to a group of pre-synaptic spike events from respective source neurons. The data corresponding to the group of pre-synaptic spike events are subsequently stored in the block of memory. The block of memory is also configured to store a pointer table. The pointer table is configured to store a pointer to each of the groups of pre-synaptic spike events stored in the block of memory, and increment labels, corresponding to each pointer, at each time interval.

As used herein, a processing-in memory (PIM) capable device refers to a memory device capable of performing arithmetical and logical operations on data stored in an array of memory cells using a processing resource internal to the memory device (e.g., without transferring the data to an external processing resource such as a host processor). As an example, a PIM-capable device may include a memory array coupled to sensing circuitry comprising sensing components operable as 1-bit processing elements (e.g., to perform parallel processing on a per column basis) or multi-bit processing elements (e.g., to perform parallel processing on a per slice basis, wherein each slice, a slice of a row, comprises multiple columns). A PIM-capable device may also perform memory operations in addition to logical operations performed "in memory," which may be referred to as "bit vector operations." As an example, a PIM-capable device may include a dynamic random-access memory (DRAM) array with memory operations including memory access operations such as reads (e.g., loads) and writes (e.g., stores), among other operations that do not involve operating on the data, as well as additional operations that do involve operating on the data. For example, a PIM-capable device may operate a DRAM array as a "normal" DRAM array and/or as a PIM DRAM array depending on a type of program being executed (e.g., by a host), which may include both memory operations and bit vector operations. For example, bit vector operations may include logical operations such as Boolean operations (e.g., AND, OR, XOR, etc.) and transfer operations such as shifting data values in the array and inverting data values, for example.

As used herein, a PIM operation may refer to various operations associated with performing in memory processing utilizing a PIM-capable device. An operation hierarchy can be used to define a PIM operation. For example, a first (e.g., lowest) level in the operation hierarchy can include bit vector operations (e.g., fundamental logical operations, which may be referred to as "primitive" operations). A next (e.g., middle) level in the hierarchy can include composite operations, which comprise multiple bit vector operations. For instance, composite operations can include mathematical operations such as addition, multiplication, etc., which can comprise a number of logical ANDs, ORs, XORs, shifts, etc. A third (e.g., highest) level in the hierarchy can include control flow operations (e.g., looping, branching, filtering, matching, etc.) associated with executing a program whose execution involves performing processing using a PIM-capable device.

As described in more detail herein, PIM operations may be executed by various components within a system comprising a PIM-capable device. For instance, a first PIM control component (e.g., control logic, which may be referred to as a "scalar unit"), which may be located on a host, may execute control flow operations and provide composite operations to a second PIM control component (e.g., a sequencer), which may also be located on the host or on the PIM-capable device. In a number of embodiments, the second control component may provide low-level bit vector operations to a PIM control component located on the PIM-capable device (e.g., bit vector timing circuitry), which may execute the bit vector operations in memory and return results to the host. As described further herein, an interface used to transfer PIM operations between a PIM-capable device and the host may include a channel, which may include a bus separate from a typical memory interface, such as a DDR interface, used to transfer commands, addresses, and/or data. Also, in a number of embodiments, providing PIM control components on the host may provide benefits such as allowing a PIM program to use virtual addressing (e.g., by resolving virtual addresses on the host since the PIM-capable device may operate only on physical addresses).

FIG. 1 is a block diagram of a system 100 including a memory device 120, in accordance with a number of embodiments of the present disclosure. Memory device 120, which may also be referred to herein as a "PIM-capable device" or "PIM-capable memory device," may include any suitable memory device. For example, memory device 120 may include volatile memory (e.g., RAM, DRAM, etc.) and/or non-volatile memory (e.g., flash memory, a cross-point memory device such as a 3D cross-point memory device, etc.). Memory device 120 may include a memory array 130 (i.e., including memory cells) coupled to sensing circuitry, as described in more detail below. According to some embodiments, memory device 120 may include multiple memory arrays 130 organized in banks, ranks, decks, plains, blocks, segments or some other form.

System 100 further includes a host 111 coupled to memory device 120. Host 111 may include a host system such as a personal laptop computer, a desktop computer, a digital camera, a smart phone, or a memory card reader, among various other types of hosts. Host 111 may include a system motherboard and/or backplane and may include a number of processing resources (e.g., one or more processors, microprocessors, or some other type of controlling circuitry). System 100 may include separate integrated circuits or both host 111 and memory device 120 may be part of the same integrated circuit (e.g., on a same chip). System 100 may include, for instance, a server system and/or a high-performance computing (HPC) system and/or a portion thereof.

Host 111 may include various components including PIM control components (e.g., control logic 131, a sequencer 132), a channel controller 143, and a memory management unit (MMU) controller 134. Control logic 131 may be configured to execute control flow commands associated with an executing PIM program and to provide composite commands to sequencer 132. Control logic 131 may be, or may include, a RISC type controller configured to generate and issue an extensible set of composite operation PIM commands that includes commands different from DDR commands sent to sequencer 132. In some embodiments, control logic 131 may be configured to issue composite operation commands to cause bit vector operations to be performed on memory device 120. In some embodiments, the composite operation commands may be transferred from control logic 131 to memory device 120 (e.g., via sequencer 132 and channel 157).

Control logic 131 may, in some embodiments, decode microcode instructions into function calls, which may be microcode function calls, associated with performing a bit vector operation, implemented by sequencer 132. The microcode function calls may be the operations that sequencer 132 receives and/or executes to cause memory device 120 to perform particular bit vector operations using the sensing circuitry, such as sensing circuitry 150.

As shown in FIG. 1, control logic 131 and MMU controller 134 are located on host 111, which may allow for control logic 131 and/or MMU controller 134 to access virtual addresses stored on host 111 and perform virtual to physical address resolution (e.g., translating a virtual address of an address space associated with an application running on the host 111 with actual physical address of the memory device 120) prior to transferring instructions to memory device 120. The translation may be performed at a host by looking up address translation tables stored in memory device 120 (e.g., page tables) or by performing the same on memory device 120. In some embodiments, control logic 131 and/or sequencer 132 are located in memory device 120, for instance in controller 140 or in row decoder 146. In other embodiments, control logic 131, sequencer 132, or MMU controller 134 may be distributed such that part of their functionality is located on host 111 and another part on memory device 120.

As used herein, a "bit vector" may refer to a physically contiguous number of bits, whether physically contiguous in rows (e.g., horizontally oriented) or columns (e.g., vertically oriented). A PIM-capable device may be configured to perform bit vector operations such as logical operations and/or transfer operations on a number of contiguous portions (e.g., "chunks") of virtual address space. For example, a chunk of virtual address space may have a bit length of 256 bits. A chunk may or may not be contiguous sequentially to other chunks in the virtual address space, however, it will be contiguous within a scope of a memory page. In disclosed embodiments, A PIM capable device may be configured to perform the said operations in virtual address space after translation of virtual addresses of virtual pages to physical addresses of physical pages.

MMU controller 134, which may reside on host 111 (as shown in FIG. 1), may be responsible for performing the translation of virtual memory addresses (e.g., addresses associated with the host 111) to physical addresses (e.g., addresses associated with the memory device 120). MMU controller 134 may also perform memory protection operations, cache control, and/or bus arbitration operations.

Timing circuitry 133 may provide timing to coordinate performance of logical operations and may be responsible for providing conflict free access to arrays, such as memory array 130 in FIG. 1. In various embodiments, controller 140 and/or the timing management circuitry 135 may generate status information, which may be transferred to or from host 111, for example via channel 157. Channel 157 may be independent of (e.g., separate from) a double data rate (DDR) memory interface (e.g., control bus 154) that may be used to transfer (e.g., pass) DDR commands between host 111 and memory device 120. That is, in some embodiments, channel 157 may be used to transfer commands between a host 111 and a memory device 120, a memory access device, or another memory interface. Non-limiting examples of a memory interface include a double data rate (DDR) memory interface, a peripheral component interconnect express (PCIe) memory interface, a coherent accelerator processor interface (CAPI), compute express link (CXL), cache coherent interconnect for accelerators (CCIX), and combinations and subcombinations of the foregoing, without limitation.

As a non-limiting example, a DDR memory interface (e.g., control bus 154) may be used to transfer (e.g., pass) DDR commands between host 111 and memory device 120. That is, in some embodiments, channel 157 may be used to transfer commands to cause performance of bit vector operations from host 111 to memory device 120, while control bus 154 may be used to transfer DRAM commands (or commands of another type of memory interface) from host 111 to memory device 120. In some embodiments, the DRAM commands (or other types of commands) that are transferred via control bus 154 may be commands to control operation of DRAM (or commands to control other types of memory, memory access devices, or memory interfaces) such as DDR1 SDRAM, DDR2 SDRAM, DDR3 SDRAM, DDR4, DDR5 and other versions of a DDR type protocol, without limitation. In other embodiments, memory device 120 may signal to host about readiness of operations via channel 157. In some embodiments, channel 157 is combined with control bus 154 and/or data bus 156. Further, in some embodiments, host 111 may include multiple memory devices 120 with multiple channels and/or control buses.

In some embodiments, sequencer 132 may include a very large instruction word (VLIW) type controller configured to operate on logical operation commands and control logic 131 may be configured to issue the logical operation commands to sequencer 132 in response to a signal from a processing resource (not shown) of host 111. For example, sequencer 132 may be configured to sequence multiple logical operations such that composite operation commands may be issued by sequencer 132. Control logic 131 may, in some embodiments, be configured to generate an executable instruction such as a VLIW type instructions or an SMID type instructions. In an embodiment including a VLIW type instruction controller, control logic 131 may be configured to generate a VLIW as a bit vector operation command(s). The VLIW may comprise microcode instructions. Sequencer 132 may be, or may include, the VLIW type controller configured to decode the VLIW into a plurality of separate microcode instructions. For example, sequencer 132 may decode the VLIW into instructions to cause performance of composite operations (e.g., ADD, MULTIPLY, DOT PRODUCT, without limitation). In some embodiments, the composite operation commands may provide an entry point into a sequence of VLIW instructions to cause perform such composite operations. In an embodiment including an SMID type instruction controller, control logic 131 may be configured to generate a unit of data, such as a vector of data, without limitation, and sequencer 132 may cause execution of a single instruction in parallel on multiple data points identified in the unit of data.

Sequencer 132 may be coupled to memory device 120 and may pass commands to coordinate bit vector operations to memory device 120 via channel 157. Microcode instructions may be executable in sequence and/or in parallel by sequencer 132 itself and/or by other components in the memory device 120 (e.g., bit vector operation timing circuitry 139, timing circuitry 133, timing management circuitry 135, and/or sensing circuitry 150). Memory array 130 may include a DRAM array, SRAM array, STT RAM array, PCRAM array, TRAM array, RRAM array, NAND flash array, and/or NOR flash array, for instance. Memory array 130 may include memory cells arranged in rows coupled by access lines, which may be referred to herein as word lines or select lines, and columns coupled by sense lines, which may be referred to herein as data lines, digit lines, or bit lines. Although a single memory array is shown in FIG. 1, embodiments are not so limited. For instance, memory device 120 may include a number of memory arrays 130 (e.g., a number of banks of DRAM cells, NAND flash cells, etc.).

Memory device 120 includes address circuitry 142 to latch address signals for data provided over a data bus 156 (e.g., a data/address bus) through I/O circuitry 144. Status and/or exception information may be provided from controller 140 on memory device 120 to a channel controller 143, through an interface (e.g., a high-speed interface (HSI)) including channel 157. Address signals are received through address circuitry 142 and decoded by a row decoder 146 and a column decoder 152 to access memory array 130. Data may be read from memory array 130 by sensing the state of memory cells on the digit lines using sensing circuitry 150. The state of memory cells may be sensed as, for example, voltage and/or current changes, magnetic state changes, resistivity, and quantum state, and so on, depending on the memory cell technology. Sensing circuitry 150 may read and latch a page (e.g., row) of data from memory array 130. I/O circuitry 144 may be used for bi-directional data communication with host 111 over data bus 156. Write circuitry 148 can be used to write data to memory array 130. In some embodiments, write circuitry 148 is combined with sensing circuitry 150. In other embodiments, sensing circuitry 150 can be a part of column decoded 152 and/or row decoder 146. In some embodiments, control bus 154 may serve as both a control and address bus for DRAM control and addressing (e.g., in accordance with a DDR protocol in which control bus 154 operates as a unidirectional data bus). Although shown as separate buses in FIG. 1, in some embodiments, control bus 154 and data bus 156 may not be separate buses. Controller 140 (e.g., memory controller) may decode signals provided by control bus 154 from host 111. These signals can include chip enable signals, write enable signals, and address latch signals that are used to control DRAM operations performed on memory array 130, including data read, data write, and data erase operations. In various embodiments, controller 140 may be responsible for executing instructions from host 111 and sequencing access to memory array 130. Controller 140 may include a state machine, sequencer, or some other type of controller and include hardware and/or firmware (e.g., microcode instructions) in the form of an application specific integrated circuit (ASIC). In a number of embodiments, controller 140 may include bit vector operation timing circuitry 139. Controller 140 may control, for example, sensing circuitry 150. For example, controller 140 may control generation of clock signals and application of the clock signals to compute components in association with performing bit vector operations.

As shown in FIG. 1, bit vector operation timing circuitry 139 may include timing circuitry 133 and timing management circuitry 135. Timing circuitry 133 may include a FIFO buffer to provide timing coordination with sensing circuitry 150 associated with memory array 130 of memory cells. In some embodiments, timing circuitry 133 may include a state machine, such as an atomic state machine.

Timing management circuitry 135 may be configured to coordinate timing of logical operations (e.g., a sequence of logical operations), associated with the bit vector operation, performed using a row address strobe (RAS)/column address strobe (CAS) component 136 associated with memory array 130. RAS component 136 may be configured to send and/or receive a signal (e.g., RAS/CAS signal) to or from memory array 130 to identify and/or select a row and/or column address of memory array 130. Memory device 120 may, in some embodiments, be configured to execute a DRAM operation such as a memory array access request, which may be issued by host 111 via control bus 154. In some embodiments, timing management circuitry 135 may be configured to execute instructions to control timing of performance of a bit vector operation.

In one or more embodiments, portions of controller 140, (e.g., bit vector operation timing circuitry 139, timing circuitry 133, and/or timing management circuitry 135), may include a reduced instruction set computer (RISC) type controller operating on, for example, 32- and/or 64-bit length instructions. In various embodiments, timing management circuitry 135 may be responsible for executing instructions received from timing circuitry 133 to cause performance of bit vector operations involving data values associated with sensing circuitry 150.

As described further below, in a number of embodiments, sensing circuitry 150 may include a plurality of sensing components, which can each include a sense amplifier and a compute component. The compute component may serve as an accumulator, and sensing circuitry 150 may be used to perform bit vector operations (e.g., on data associated with complementary digit lines). In a number of embodiments, sensing circuitry 150 may be used to perform bit vector operations using data stored in memory array 130 as inputs and/or store the results of the operations back to the memory array 130 without transferring data via a digit line address access (e.g., without firing a column decode signal). For instance, various operations (e.g., bit vector operations) may be performed using, and within, sensing circuitry 150 rather than (or in association with) being performed by processing resources external to sensing circuitry 150 (e.g., by a processing resource associated with host 111 and/or other processing circuitry, such as ALU circuitry, located on memory device 120 (e.g., on controller 140 or elsewhere)). In a number of embodiments, sensing circuitry 150 (e.g., the number of sensing components) may be used to execute bit vector operations in a SIMD (single instruction multiple data) manner with the sensing components serving as 1-bit processing elements on a per column basis. In embodiments in which sensing circuitry 150 executes bit vector operations, sensing circuitry 150 may serve as and/or be referred to as an "in memory processor." As described more fully below, in some embodiments, sensing circuitry 150 may include a sequencer (e.g., similar to sequencer 132). In other embodiments, neighboring sensing components may exchange data bits amongst each other, thus producing computation based on multiple data sources. In other embodiments, sensing components may produce different computations depending on their location within sensing circuitry 150, thus, providing computation in VLIW or SIMD manner. In embodiments in which sensing circuitry 150 executes bit vector operations, sensing circuitry 150 may serve as and/or be referred to as an "in memory processor." As described more fully below, in some embodiments, sensing circuitry 150 may include a sequencer (e.g., similar to sequencer 132).

In various approaches, data associated with an operand, for instance, may be read from memory via sensing circuitry and provided to external memory array ALU circuitry via I/O lines (e.g., via local I/O lines and/or global I/O lines). The external memory array ALU circuitry may include a number of registers and would perform bit vector operations using the operands, and the result may be transferred back to the array via the I/O lines. In other embodiments, sensing circuitry 150 is configured to perform bit vector operations on data stored in memory array 130 and store the result back to the memory array 130 without enabling an I/O line (e.g., a local I/O line) coupled to sensing circuitry 150.

In a number of embodiments, circuitry external to memory array 130 and sensing circuitry 150 may not be needed to perform operations as sensing circuitry 150 may perform the appropriate bit vector operations without the use of an external processing resource. Therefore, sensing circuitry 150 may be used to complement and/or to replace, at least to some extent, such an external processing resource (or at least the bandwidth consumption of such an external processing resource). However, in a number of embodiments, sensing circuitry 150 may be used to perform logical operations (e.g., to execute instructions) in addition to logical operations performed by an external processing resource (e.g., host 111). For instance, host 111 and/or sensing circuitry 150 may be limited to performing only certain logical operations and/or a certain number of logical operations.

Enabling an I/O line can include enabling (e.g., turning on) a transistor having a gate coupled to a decode signal (e.g., a column decode signal) and a source/drain coupled to the I/O line. However, embodiments are not limited to performing logical operations using sensing circuitry (e.g., sensing circuitry 150) without enabling column decode lines of the array. Whether or not local I/O lines are used in association with performing logical operations via sensing circuitry 150, the local I/O line(s) may be enabled in order to transfer a result to a suitable location other than back to memory array 130 (e.g., to an external register).

Various embodiments of the disclosure relate to processing spiking events in a SNN, and more specifically to performing PIM spiking event operations. According to various embodiments described herein, in a SNN, pre-synaptic spike signals of source neurons are routed to a destination neuron by performing PIM operations. For example, a SNN is emulated, at least in part, by performing PIM operations on one or more resistive memory arrays. Additionally and more specifically, accordingly to various embodiments described herein, in a SNN, PIM operations are performed to, among other things, filter pre-synaptic events according to their appropriate destination, determine when pre-synaptic spike events are triggered, determine when pre-synaptic spike event become spike events, maintain neuron membrane potential, generate spike events, adjust synaptic weights, etc.

Figure 2:
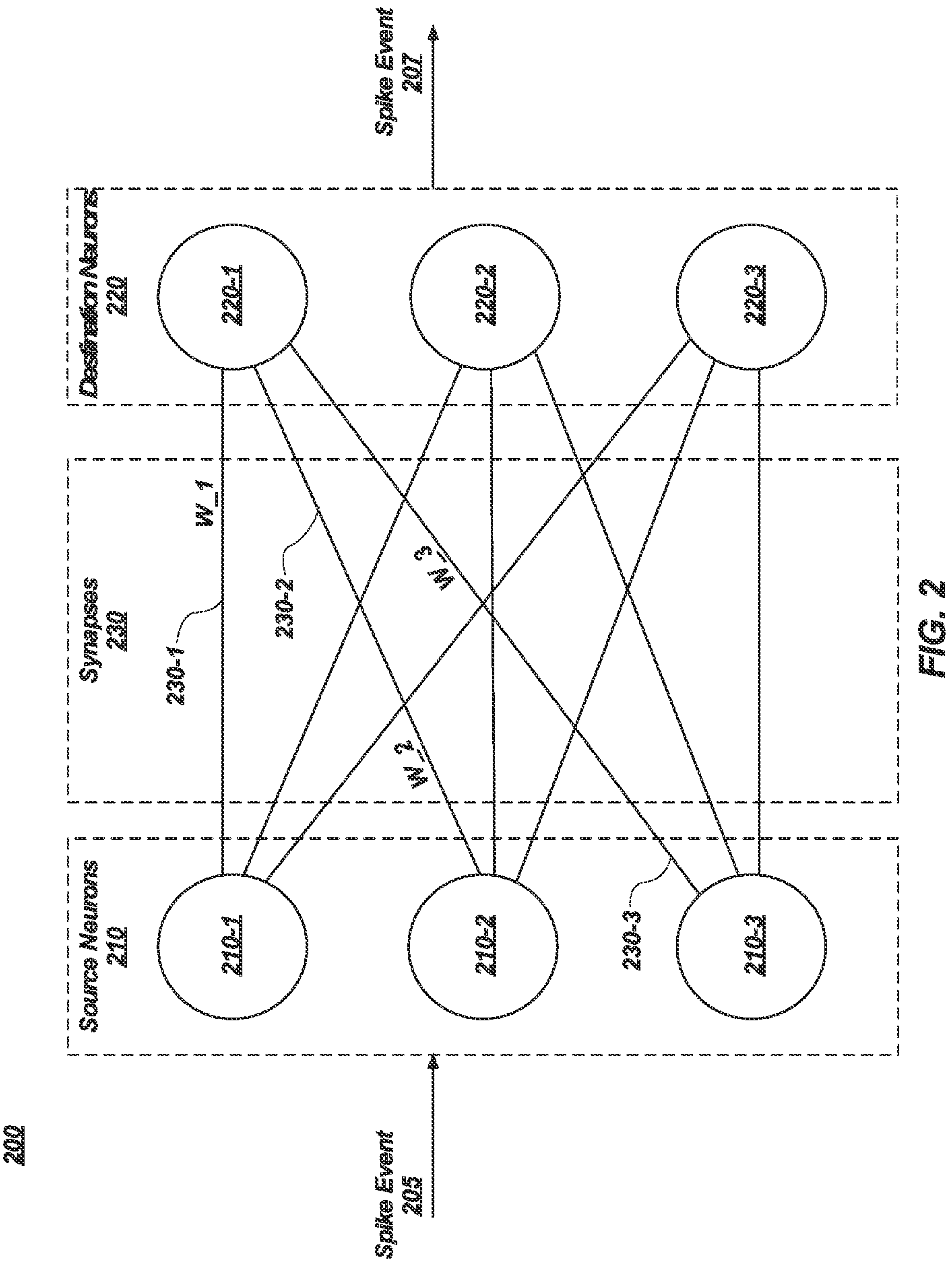
FIG. 2 illustrates a spiking neural network according to various embodiments of the present disclosure.

FIG. 2 depicts an embodiment of SNN 200 that includes multiple levels of neurons. SNN 200 includes a first level of neurons (e.g., source neurons 210 that includes source neuron 210-1, source neuron 210-2 and source neuron 210-3) connected to a second level of neurons (e.g., destination neurons 220 that includes destination neuron 220-1, destination neuron 220-2 and destination neuron 220-3) via synapses 230 (also referred to as synaptic connections). For the sake of brevity and clarity, only two levels of neurons are depicted in SNN 200. However, SNN 200 may include any number of levels of neurons. Additionally, each level of neurons can include any number of neurons. For example, source neurons in any level of SNN 200 can each include thousands of neurons, where each neuron in a first level (e.g., source neurons 210) has a group of synaptic connections 230 with each neuron in a next level (e.g., destination neurons 220). In such an example, synapse 230-1 connects neuron 210-1 with destination neuron 220-1, synapse 230-2 connects source neuron 210-2 with destination neuron 220-1, and synapse 230-3 connects source neuron 210-3 with destination neuron 220-1. Likewise, source neuron 210-2 has synaptic connection with each of destination neurons 220, and source neuron 210-3 has a synaptic connection with each of destination neurons 220.

Each of source neurons 210 may receive an input (e.g., spike event 205) generated by a number of neurons in a previous level or layer of SNN 200 (not shown). As such, source neurons 210 may be considered destination neurons while neurons in the previous level may be considered source neurons. The definition of "level" is used here for case of representation. In reality, a level does not have fixed boundaries: it can be any group of selected neurons, the neurons selected by certain criteria, such as neuron function, locality, proximity and so on, including random selection. Thus, neurons may form connections within levels. Thus, any neuron of a group of source neurons of any level can also be a destination neuron of any group of destination neurons of any other level. Similarly, any neuron of a group of destination neurons of any level can also be a source neuron of any group of source neurons of any other level. Spike event 205 may represent an input current to source neurons 210. This current may be accumulated on a neuron membrane of a neuron (e.g., source neuron 210) to charge a membrane potential. When the membrane potential reaches a threshold value, the neuron generates and fires an output spike to be transferred to the next level of neurons (e.g., destination neurons 220).

The transfer of spikes from one level of neurons (e.g., source neurons 210) to a next level of neurons (e.g., destination neurons 220) may be achieved through synapses 230 (or synaptic connections). Synapses 230 may receive output signals (e.g., spikes) from source neurons 210 and transmit the signals to destination neurons 220. For example, when neuron 210-1 receives one or more spike events 205 and reaches a threshold potential value, neuron 210-1 "spikes" and an output spike is transmitted to (1) destination neuron 220-1 via synapse 230-1, (2) destination neuron 220-2 via a synapse, and (3) destination neurons 220-3 via a synapse.

Additionally, synapses 230, upon receiving the output signals from source neurons 210, may scale the signals according to adjustable synaptic weights. As such, the synapses provide a combined scaled signal as an input signal(s) to the destination neurons. For example, when neuron 210-1 receives one or more spike events 205 and reaches a threshold potential value, neuron 210-1 "spikes" and an output spike is transmitted to (1) destination neuron 220-1 via synapse 230-1, (2) destination neuron 220-2 via a synapse, and (3) destination neurons 220-3 via a synapse. For example, a spike signal from neuron 210-1 to destination neuron 220-1 along synapse 230-1 is scaled by synaptic weight, W_1 (and the spike signal from neuron 210-1 to destination neurons 220-2 and 220 3 may be scaled by the same or other weights), a spike signal from neuron 210-2 to neuron 220 1 along synapse 230-2 is scaled by synaptic weight, W_2 (and spike signal from neuron 210-2 to neurons 220-2 and 220-3 may be scaled by the same or other weights), and a spike signal from neuron 210-3 to destination neuron 220-1 along synapse 230-3 is scaled by synaptic weight, W_3 (and the spike signal from neuron 210-3 to neurons 220-2 and 220-3 may be scaled by the same or other weights). Accordingly, destination neurons 220 may generate output spikes (e.g., spike event 207) based on the corresponding combined input signals. The output spikes (e.g., spike event 207) are then transmitted to another level or layer of neurons (not shown) using another group of connections and corresponding synapses in SNN 200. Some of the output spikes (e.g., spike event 207) may be transmitted to level 210 as a part of spike event 205 via connections and corresponding synapses (not shown).

The bandwidth required to process spiking events in a SNN may be quite large. The following description provides an example of the bandwidth need to process a SNN. In general, in an SNN, every 1 millisecond (ms), 3-5% of neurons generate a spike. In various embodiments, each spike event is represented by small data struct: source neuron ID, and spike time stamp (the spike time stamp is optional and may be inferred from SNN time intervals as shown further). On average, each SNN neuron connects to about 1000s of other neurons. Spikes that neurons generate are delivered to all connections after some delay. At the time of delivery these spike events become synaptic events. For example, a spike event becomes a synaptic event when a source neuron ID matches a destination neuron ID, and spike time stamp generated by SNN system embodiment at a time of spike plus connection delay corresponds to current SNN system time stamp.

Additionally, delay values differ for each connection and are usually between 1 to 100 ms or 50 ms on average (floating point or integer). A spike time stamp is unique for each spike event. As a result, it may be desired to deliver spikes just in time when they are due at specific synapses. For a small SNN with 1 million (M) neurons (0.001% of human brain): 5% spiked×1M neurons×1000 connections per neuron×64 bytes (b) per synaptic event=400 MB/ms or 400 GB/s. That is, a computing system that emulates an SNN is required to have hardware and bandwidth to transmit 400 MB/ms (or 400 GB/s). In some conventional computing systems, processing resources (e.g., processor and associated functional unit circuitry) may not be able to transmit data at these requirements over a bus. Accordingly, there is a need for a computing system to process SNN events (e.g., pre-synaptic events, spiking events, etc.) that require a high data transmission bandwidth. As will be described in further detail below, the high bandwidth requirements may be sufficiently met by hierarchical routing and compact event storage on resistive memory arrays. For example, PIM operations implemented on resistive memory arrays may save time and/or conserve power by reducing and eliminating external communications. As will be described in further detail herein, SNNs (such as SNN 200) may be emulated, at least in part, by performing PIM operations on one or more resistive memory arrays (e.g., memory array 130).

Figure 3:
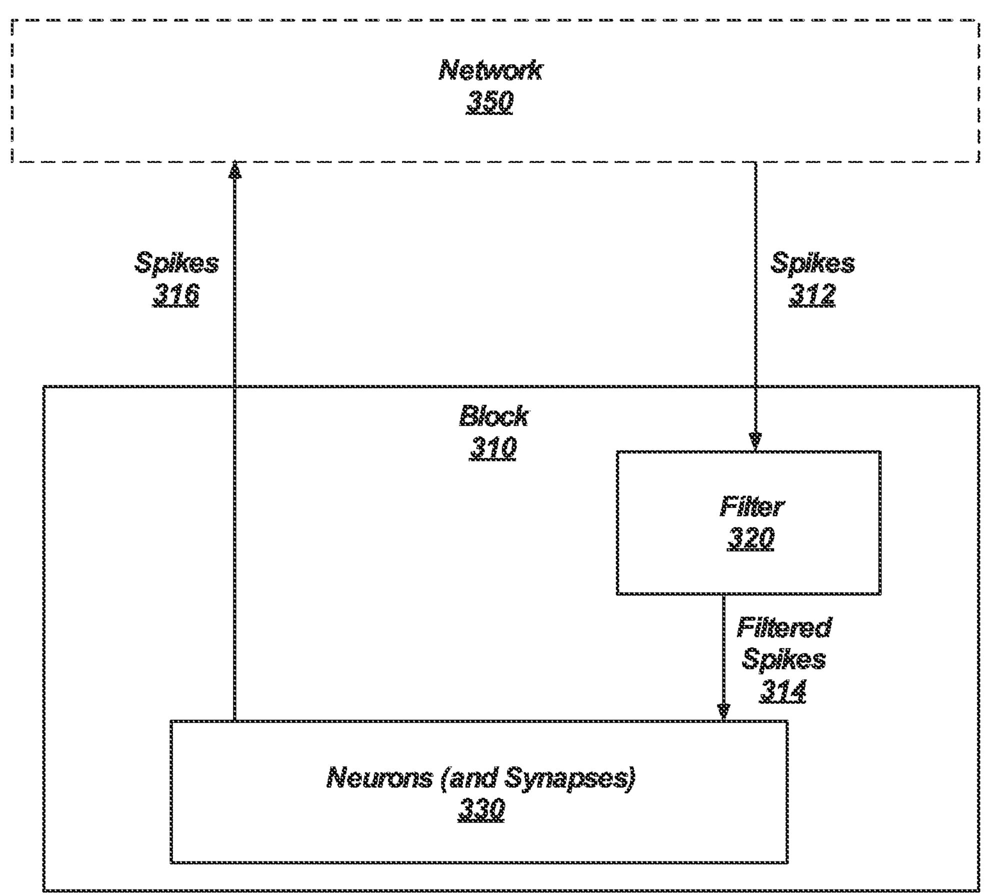
FIG. 3 illustrates a memory system for processing spiking events according to various embodiments of the present disclosure.

FIG. 3 depicts an embodiment of system 300 for data partitioning and routing of spike events. System 300 includes a number of memory blocks, such as block 310, and network 350. Block 310, in various embodiments, includes a resistive memory array. In general, a resistive memory array is a type of non-volatile random-access computer memory that comprises memory cells, which resistance can be chanced; by "resistance" is meant the amount of current flowing across a memory cell as a function voltage applied across a memory cell. Such memory cells may be memory elements, PCM cells, 3D X-point, diode-like cells and even cells based on transistors, which threshold voltage can be adjusted and, therefore, this adjustment provides ability to modulate current across memory cells (e.g., Flash memory elements with floating gate transistors). Block 310, in various embodiments, includes a single memory die, a memory tile or the like.

Block 310 includes a subset of neurons 330 in a SNN. Neurons 330 can be any subset of neurons in a SNN. It should be appreciated that block 310 includes both neurons and synapses between neurons (e.g., synapses 230). As such, neurons 330 may also include synapses associated with the neurons.

In an example, neurons 330 include neurons in a particular layer or level of an SNN. In such an example, referring to FIG. 2, neurons 330 includes destination neurons 220. Other subsets of neurons, in an SNN, are stored in other blocks of memory (not shown) that are also coupled to network 350. As such, neurons and synapses of an SNN (e.g., SNN 200) are partitioned into blocks and these blocks are connected by network 350. In various embodiments, network 350 includes a ring or torus topology, it can be digital or analog. It should be appreciated that the partitioning of neurons may include hierarchical block organization. For example, a first large block of memory is a collection of many smaller blocks of memory.

At certain time intervals (e.g., every 1 ms) a block of neurons generates spike events. For example, one or more of neurons 330 (e.g., destination neurons 220) generates spikes 316 (e.g., spike event 207) which is broadcasted to other neurons in other blocks (not shown) via network 350. At the same time (e.g., within the same interval or time period), spikes 312 from other blocks generated contemporaneously (e.g., within the same time interval or period) arrive at a number of blocks (e.g., every single block in system 300). For example, spikes 312 from other blocks (e.g., source neurons 210 stored in other blocks) are broadcast to neurons 330 in block 310. In some examples, an interval, period, or duration of time may be referred to as a time quantum, and an interval or intervals of time may be referred to as series of time quanta.

In various embodiments, for 1M neurons and 64 b spike event datum, the broadcast of spikes over network 350 may be estimated at, for example: 5% of the neurons spiked×1M neurons×64 b per synaptic event=400 KB/ms or 400 MB/s. Additionally, in some embodiments, system 300 may need 40 MB of storage to retain synaptic events locally (e.g., 400 KB×100 ms max delay). The broadcast of spike events over network 350 can be implemented either via shared memory (e.g., only 400 KB is needed for every 1M neurons) or via special bus or hybrid approach (combination of both).

In some embodiments, one or more blocks (e.g., each block) of memory in system 300 includes a filter. For example, block 310 includes filter 320. Filter 320 is configured to pass spikes that have destinations in block 310. More specifically, for example, at each time interval (e.g., every 1 ms), filter 320 filters spikes 312 and passes through filtered spikes 314 that have a destination in block 310.

In various embodiments, filter 320 may filter spikes 312 based, at least in part on, neuron IDs. For example, spikes 312 include a neuron ID (e.g., ID of a source neuron) and neurons 330 include synaptic IDs (i.e., IDs of synapses that matches the source neurons IDs that these synapses are connected to). As such, filter 320 passes through filtered spikes 314 that have a neuron ID that matches synaptic IDs of neurons 330. For 1M neurons, and 32b neuron ID, each local filter for each block (e.g., filter 320 in block 310) may perform partial address match at the speed of, for example, 200 KB/ms or 200 MB/s at every block (i.e., 5% spiked×1M neurons×32b per neuron ID=200 KB/ms or 200 MB/s).

In various embodiments, matching or filtering functionality, alternative to filter 320, may include an address scheme with predetermined algorithmic allocation. For example, allocating target neurons such that a block ID matches some part of source neuron IDs. This may not be always possible due to unique topologies. In some embodiments, a hybrid method, including a combination of filter and address schemes, can be used. The same architecture (blocks organized on a bus such as a ring) can be used for other neural models: e.g., deep neural network (DNN), artificial neural network (ANN), long short-term memory (LSTM), where each block stores sets of neural net layers in sequence such that subsequent layers feed data into the next ones. As a result, blocks work in a daisy-chain manner. For example, each block receives data from the preceding block and pushes data to the bus for a subsequent block. Additionally, instead of spikes, it can be any data that is specific to the neural model used. Recursion of neural net is possible within a block since it would benefit from low-latency local communication.

Figure 4:
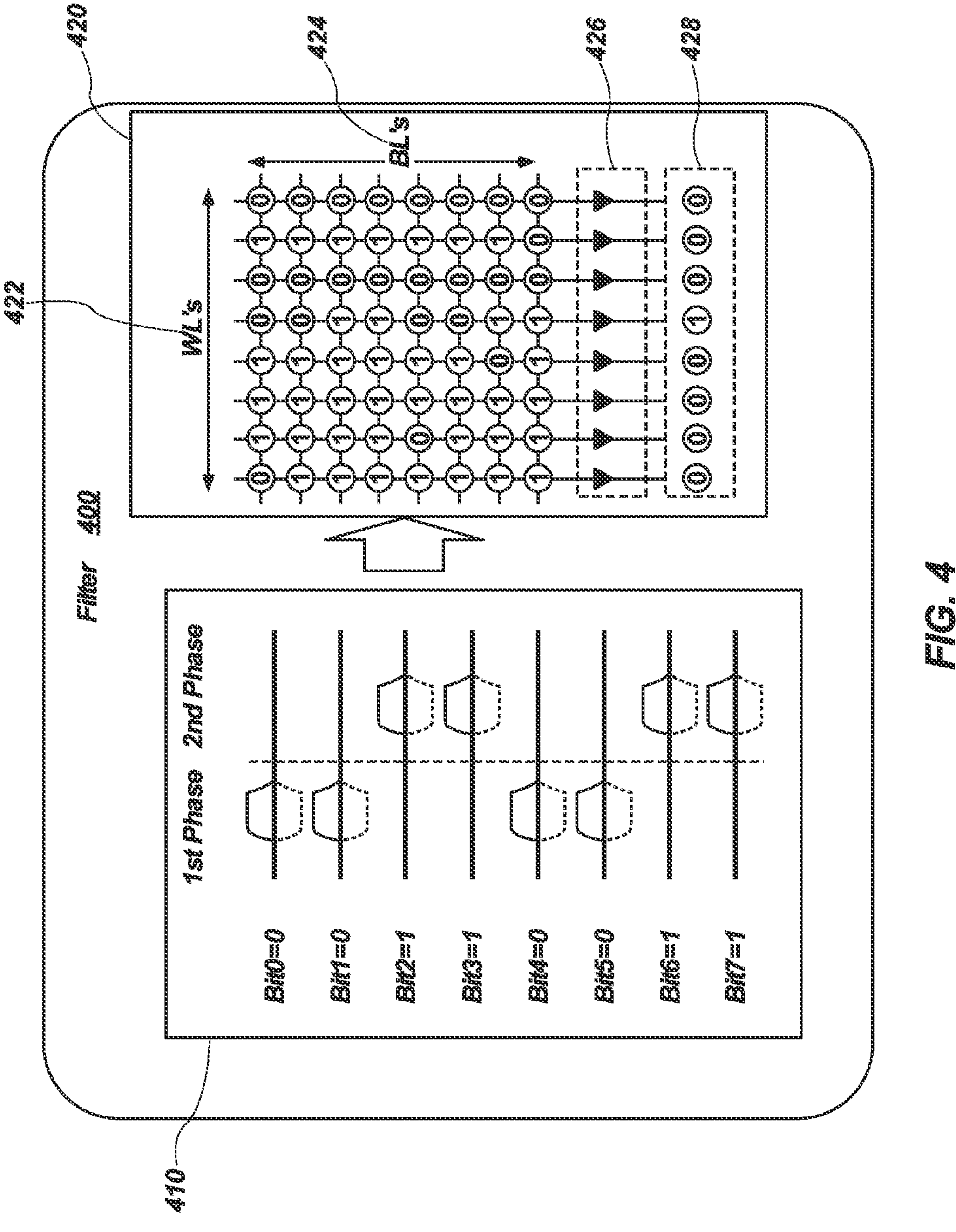
FIG. 4 illustrates a filter configured to filter spiking events according to various embodiments of the present disclosure.

FIG. 4 depicts an embodiment of filter 400. Filter 400, in one embodiment, is filter 320 (as shown in FIG. 3). Filter 400 includes a resistive memory array 420, and is configured to receive spike events (e.g., spikes 312 shown in FIG. 3) from neurons in other blocks (e.g., from source neurons 210 (see FIG. 2) stored in another block). For example, the spike events include a spiked neuron ID 410, such as an identification of a source neuron in source neurons 210. Spiked neuron ID 410, in various embodiments, may include an N-bit number (e.g., an 8-bit number such as 00110011).

Resistive memory array 420 includes a number of word lines 422 and bit lines 424. At each intersection of word lines and bit lines of resistive memory array 420 is a resistive memory element (e.g., memory element or PCM element or MTX or alike). Each bit line, in resistive memory array 420, stores the bits of a destination synapse identification. For example, as illustrated in FIG. 4, a first bit line stores destination synapse identification (e.g., 01111111) along respective memory elements, a second bit line stores destination synapse identification (e.g., 111101111) along respective memory elements, and so on. Referring to FIG. 3, the destination synapse identifications stored in resistive memory array 420 may include the synapse identifications of neurons 330. Each synapse of a particular destination neuron can be stored on the same bit line (assuming that a bit line is much longer than depicted on FIG. 4), or they can be stored on several bit lines.

Spiked neuron ID 410 is transmitted on word lines 422. For example, Bit0 ("0"), of spiked neuron ID 410, is transmitted onto a first word line. Bit1 ("0"), of spiked neuron ID 410, is transmitted on a second word line. Bit2 ("1"), of spiked neuron ID 410, is transmitted on a third word line and so on. In various embodiments, spiked neuron IDs, input into word lines 422, are grouped into positive polarity and negative polarity forward propagation phases. As an example, the input of spiked neuron ID 410 into word lines 422 can be done in two phases. For example, a first phase of bits are transmitted on respective word lines. Upon transmission of the first phase, then a second phase of bits are transmitted on respective word lines.

Upon transmission of spiked neuron ID 410 along word lines 422, an output of respective sense amplifiers 426 indicates whether there is a match between spiked neuron ID 410 and destination neuron IDs stored along the bit lines 424. In one embodiment, a partial match is determined after a first phase of bits are transmitted on respective word lines. Alternatively, a full match is determined after the first and second phase of bits are transmitted on word lines 422. More than 2 phases may be needed if the memory elements are capable of storing multiple bits, such as, for example, Flash memory elements including QLC, MLC, Flash memory cells and alike.

In various embodiments, a determination of a mismatch is based on detection of a snapback event. Alternatively, a determination of a match is based on no detections of a snapback event. Detection of snapback in the first phase may be used to abort the second phase. A snapback event may result in a sudden conductance, under certain conditions. An occurrence of a snapback event tends to significantly affect a current-voltage behavior of a memory cell. As such, a sense circuit may, for example, may be provided that is responsive to a snapback event occurrence in a memory cell. The sense circuit may generate one or more feedback signals that initiate a change in an electric potential being applied to a memory cell.

Table 1 depicts the determination of a match or mismatch based on detection of snapback events.

TABLE 1

| Input State | Memory State | Result | |
|---|---|---|---|
| 0 | 0 | No Snapback | Match |
| 0 | 1 | Snapback | Mismatch |
| 1 | 0 | Snapback | Mismatch |
| 1 | 1 | No snapback | Match |

The input state refers to the value of a bits of spiked neuron ID 410. For example, the input state of Bit0 is "0," the input state of Bit1 is "1" and so on. Likewise, the memory state refers to the value of the bits in the memory elements along a bit line. For example, referring to the fifth bit line (from the left), the destination neuron ID is 00110011. As such, a memory state of the first bit is "0," a memory state of the second bit is "0," a memory state of the third bit is "1" and so on.

It is noted that both bit line and word line selection direction may change in each phase. Additionally, unselected bit lines and word lines remain at inhibit level. The input pattern affects both the word line and bit line signals.

An indication of a match is output 428 of "1" (e.g., the fifth bit line from the left) generated by a sense amplifier corresponding to the bit line. Output 428 is a bitmask of the matched destination synapse ID of a certain destination neuron. Multiple synapses may have the same IDs due to the same source neuron targeting multiple destination neurons.

Figure 5:
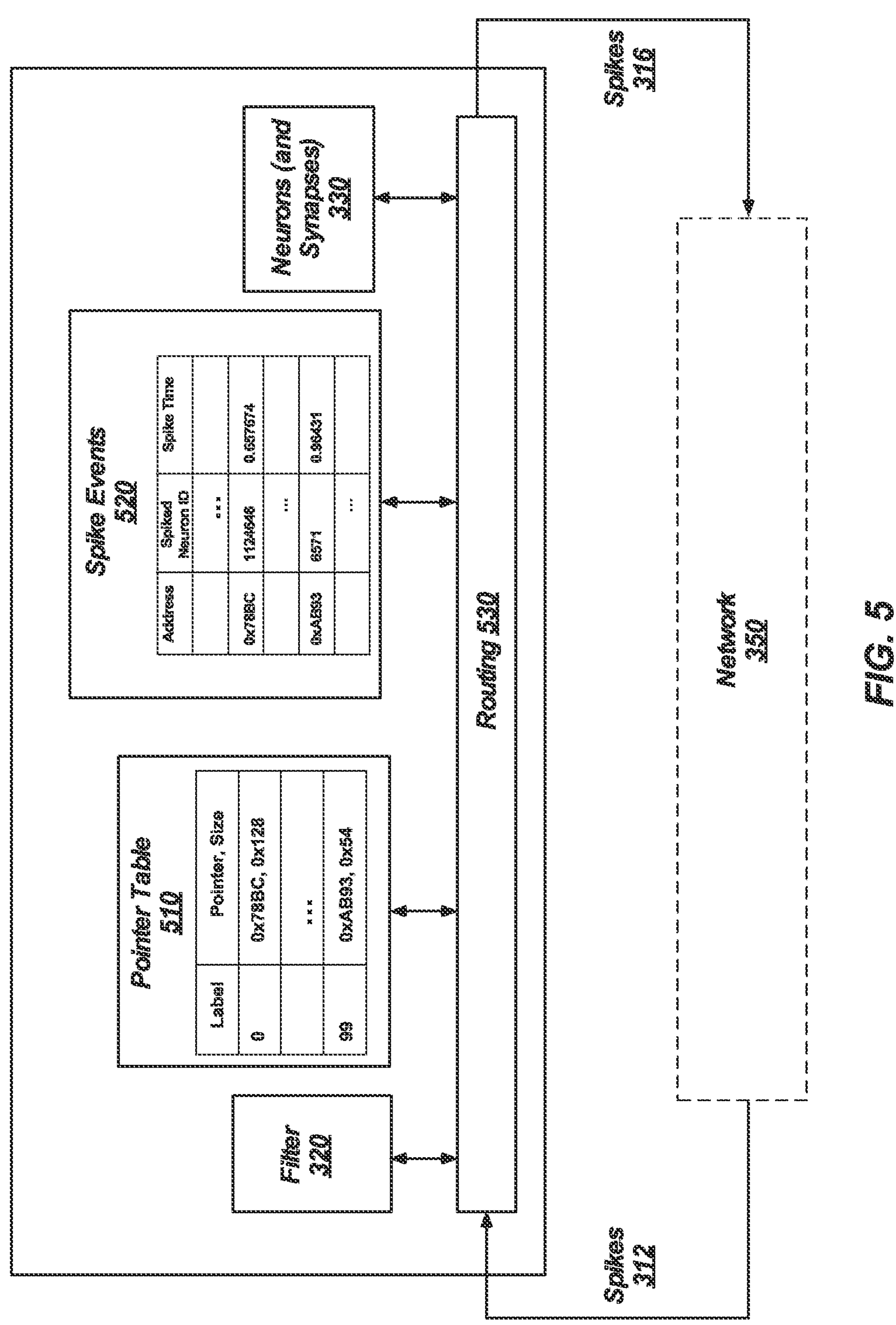
FIG. 5 illustrates a memory system, including a pointer table, for processing spiking events according to various embodiments of the present disclosure.

FIG. 5 depicts an embodiment of system 500. System 500, in one embodiment, is similar to system 300. For example, system 500 includes block 310, filter 320, neurons 330 and network 350. Also, filter 320 is configured to receive incoming spikes 312 from network 350, and outgoing spikes 316 (from neurons 330) are transmitted to network 350. In various embodiments, transmission of data within block 310 is via routing element 530 (e.g., data bus).

Spike events 520 may include spike events that are filtered by filter 320. In one embodiment, spike events 520 are filtered spike events 314 (as described with respect to at least FIG. 3). For example, spike events 520 are a subset of spikes 312 that have a destination in block 310 and pass through filter 320. Spike events 520 are stored in block 310 (upon passing through filter 320). In various embodiments, each spike event in spike events 520 includes a memory address, spiked neuron ID and spike time.

Block 310 includes pointer table 510 configured to store labels for spike events 520 that pass through filter 320 and are subsequently stored in block 310. For example, pointer table 510 includes labels for pointers of various groups of spike events that have passed through filter 320. In various embodiments, every time interval (e.g., every 1 ms), a group of spike events 520 pass through filter 320 and are stored in block 310 in designated memory array(s). The group is assigned a label "0," in pointer table 510, indicating that it is the most recent spike events that have passed through filter 320 (at the most recent time interval). The labels of other previously filtered groups are then incremented by 1. There are as many groups as time interval in the maximum possible delay between a pair of neurons (e.g., between a source neuron and a destination neuron). For example, given the maximum delay of 100 ms and time interval 1 ms, there are 100 groups and associated labels. The label that is incremented to 100 becomes "0," and previously stored spike events are overwritten with the group of spike events (or simply spikes) that just arrived (most recent time interval).

The maximum delay may be more or less than 100 ms. For example, spike-timing-dependent plasticity (STDP) may require more groups than just the maximum delay measured in terms of time quants (e.g., 100 groups in our case given maximum delay 100 ms and a single time interval 1 ms), which will be described in further detail below. In general, STDP is a biological process that adjusts the strength of connections (i.e., synapses) between neurons in the brain. The process adjusts the connection strengths based on the relative timing of a particular neuron's output and input action potentials (or spikes).

In one embodiment, spike time of the spike events is optional data to reduce time quantization for SNN subsections requiring precise timing. The time of a spike is between 0 and 1 (precise value within the time interval) since the coarse-grain time is implied by the time interval and associated label. As a result, spike events 520 (and pointer table 510) are a compact representation of all presynaptic spike events bucketized by time interval.

Figure 6:
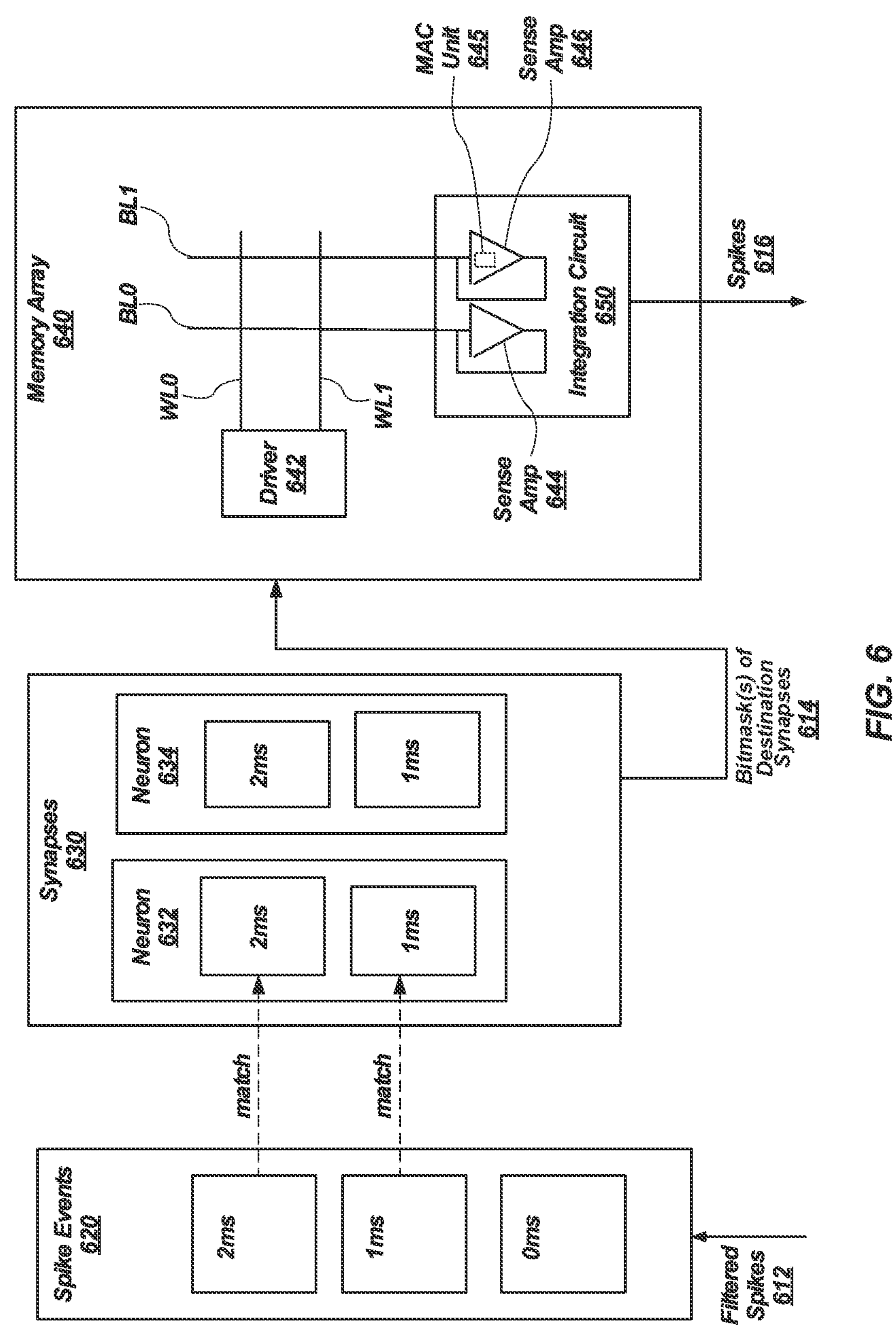
FIG. 6 illustrates a memory system for processing spiking events according to various embodiments of the present disclosure.

FIG. 6 depicts an embodiment of system 600 configured to translate pre-synaptic spike events to synaptic events. In particular, system 600 is configured to translate pre-synaptic spike events within a block of memory (e.g., block 310).

System 600 includes spike events 620 that are stored in a memory array of a block of memory. Spike events 620 (e.g., filtered spikes 314, spike events 520), in various embodiments, are pre-synaptic spike events, for example, from source neurons. For example, referring to FIG. 2, spike events 620 are pre-synaptic spike events from source neurons 210.

Synapses 630 (e.g., synapses 230) may receive output signals (e.g., spikes) from source neurons and transmit the signals to destination neurons. Synapses 630 are stored in a memory array in a block of memory such that synapses of each neuron are stored in predetermined possibly contiguous area. Synapses also may be stored in a memory array separate and distinct from a memory array that stores spike events 620 (and different from memory array 640).

Each neuron (e.g., a destination neuron) has pre-synaptic (incoming) connections. In various embodiments, a connection (e.g., synapse) includes the following information: a pre-synaptic neuron ID, a precise delay value (optional), and a connection weight.

Additionally, each connection has a delay including a delay value of some range: e.g., between 1 ms and 100 ms. The delay value can be quantized in increments of time interval (e.g., 1 ms, 2 ms, 3 ms and so on) or it can be precise (e.g., 1.23523 ms). Synaptic connections of each neuron (specifically pre-synaptic neuron IDs, i.e., the IDs of source neurons) stored or allocated in buckets in the increments of 1 time interval according to the quantized part of the delay: e.g., a bucket of connections which all have a delay of 1 ms, a bucket of connections which all have a delay of 2 ms and so on. The precise delay value may be used to reduce quantization, but is optional. The precise delay value is an addition to quantized delay: e.g., 2 ms (implied from bucket number)+0.34234 ms=2.34234 ms, where 2.34234 ms is the precise delay value. The precise delay value may be needed for some SNN sections requiring high accuracy. Depending on the embodiment, this may be a floating point or integer or some other custom format.

Synapses 630 grouped by number of neurons where each synaptic connection of the neuron is further grouped into buckets of quanta. For example, synaptic connections of neuron 632 (e.g., destination neuron) are separated by the value of their delay into a number of time intervals, such as, 1 ms time interval corresponding to 1-2 ms delay, 2 ms time corresponding to 2-3 ms delay and so on. Similarly, synaptic connections of neuron 634 (e.g., destination neuron) are separated into a number of time intervals, such as 1 ms time interval corresponding to 1-2 ms delay, 2 ms time interval corresponding to 2-3 ms delay and so on. Besides, groups of synapses corresponding to the same time interval from different neurons may be stored or allocated along the same word lines in the memory array section. It should be appreciated that synaptic connections can be separated into any number of time intervals (e.g., 1 ms to 50 ms, at 1 ms time interval). Additionally, synapses 630 includes two neurons 632 and 634, however, it should be appreciated that synapses 630 can include any number of neurons (e.g., destination neurons).

At each time interval, pointers of spike events 620 are incremented as previously described (e.g., 0 ms bucket is incremented to a 1 ms bucket, 1 ms bucket is incremented to a 2 ms bucket and so on).

Also, at each time interval, spiked neuron IDs in every bucket of spike events 620 are matched with pre-synaptic neuron IDs in the corresponding synaptic bucket (e.g., a 1 ms spike bucket is matched with a 1 ms synaptic bucket, a 2 ms spike bucket is matched with a 2 ms synaptic bucket and so on). In particular, at each time interval, it may be determined whether a spike neuron ID in a bucket (e.g., 2 ms bucket) in spike events 620 matches a pre-synaptic neuron ID in a corresponding bucket in synapses 630. For example, a matching function is implemented that determines whether a spike neuron ID in the 2 ms bucket of spike events 620 matches a pre-synaptic neuron ID in the 2 ms bucket of neuron 632 and neuron 634. In various embodiments, the matching function is similar to the filtering implemented by filter 320 and/or filter 400, as previously described. For example, word line drivers may drive the word lines with signals corresponding to bits of pre-synaptic neuron IDs (FIG. 4) and sense amplifiers may determine a match of mismatch on the bit lines.

A match indicates that the spike event is due to arrive at that particular time interval and for that particular synaptic connection. For example, a spike event in a time interval of 2 ms is matched with a pre-synaptic IDs in time interval 2 ms. Similarly, a spike event in time interval of 1 ms is matched with a presynaptic IDs in time interval 1 ms, and so on. In various embodiments, many synaptic events are generated every time interval for each neuron.

In various embodiments, the match function is parallel. For example, each synaptic bucket can be in a different memory array and the matching function can determine matches in parallel. In various embodiments, neurons can be distributed among many subarrays and so on. In various embodiments, pre-synaptic neuron IDs from many neurons can be allocated along word lines such that IDs belonging to the same delay bucket from many neurons are tested for a match in parallel. This results in parallel search operations. Alternatively, matching can be done in serial manner. For example, the matching function can be performed one bucket at the time in a single array, as long as the buckets are generated before the real time interval expires. Many pipelined and multiplexed variants of this method are possible.

In response to a match generated by the matching function, at each time interval, a bitmask of the synaptic events are generated. For example, the matching function is implemented similar to filter 400 in FIG. 4. The output of a match includes a bitmask. Referring again to FIG. 6, the output of a match of the matching function is matched synaptic IDs corresponding to destination synapses 614 (e.g., a bitmask).

In some embodiments, a bitmask can be merged for different neurons. However, this may be done at the expense of space efficiency. For example, the more common connections across the group of neurons considered for merging the smaller the common bitmask. In one example (i.e., no common pre-synaptic neurons in a time interval), the common bitmask is substantially increased by the number of neurons in the group. In another example (i.e., all pre-synaptic neurons in a time interval are common), the common bitmask is the same for all. In some embodiments, bitmasks are specific for each neuron. In some embodiments, on average 5% of synaptic connections get synaptic events each time interval. For example, for 1000 incoming connections, this results in 50 synaptic events per time interval. Hence, the size of bitmask is sparse (~50 set bits in 1000). The bitmask may also be compressed.

In some embodiments, the matching functionality may be avoided. For example, the matching functionality may be avoided if the network connectivity is patterned and can be described algorithmically in a compact way (e.g., 3-bit number to 8-bit 1-hot at the expense of array space). Hybrid methods of matching may also be implemented (e.g., hierarchical routing filters and matching function, event address and matching function etc.).

Memory array 640, in various embodiments, facilitates the integration of the presynaptic events according to the bitmask. Memory array 640, in various embodiments, is separate and distinct from a memory array for storing spike events 620 and a memory array for storing synapses 630.

Memory array 640 includes a number of word lines (e.g., WL0 and WL1) and a number of bit lines (e.g., BL0 and BL1). A memory element is at the intersection of each word line and bit line. In various embodiments, memory elements are utilized to store a weight of a synaptic connection. For example, the resistance or conductance of a memory element is adjusted to correspond to weight of a synaptic connection. A weight of a synaptic connection may be stored in one or more memory elements on a single bit line (or may be stored on multiple bit lines).

Driver 642 may drive signals (e.g., voltage signal or current signal) corresponding to matched synapses (e.g., bitmask) on one or more word lines. Sense amplifiers (e.g., sense amplifiers 644 and 646) at each respective bit line may generate an output voltage based on current output from the corresponding memory element. Integration circuitry 650 (that includes sense amplifiers) may integrate the output of the sense amplifiers. Upon a threshold potential value of a neuron being met, spikes 616 may be generated. Accordingly, memory array 640, at least in part, emulates spiking events in a SNN. For example, (1) signals driven by driver 642 emulates pre-synaptic events, (2) word lines, bit lines and memory elements emulates synapses and corresponding weights, and (3) sense amplifiers emulate neurons.

Integration of synaptic events may include various implementations depending on the data representation, such as (1) a digital representation of synaptic weights or (2) analog or mixed-signal representation of synaptic weights. In one embodiment, if synaptic weights are digital (floating point or integer) then the computation is the dot product of the synaptic conductance equation for the "set" positions of the bitmask. For example, the computation (or integration) is based on a constant synaptic current multiplied by synaptic weights. In various embodiments, the integration is performed by sense amplifiers (e.g., sense amplifiers 644 and 646) that include a built-in multiply-accumulate (MAC) unit (e.g., MAC unit 645). The sense amplifiers, in various embodiments, provide a function for neuron membrane equation.

Additionally, synaptic weights may be stored digitally in bit-serial or bit-parallel fashion on some section of memory array 640. In this implementation, if time-quantization effects are not desirable, a sense amplifier may compute integration at exact time spikes using optional data, such as, time stamp supplied with each pre-synaptic spike event and precise delay. This optional data may result in the synaptic event to jump to the next bucket (but no further than that).

In the analog or mixed-signal implementation, the synaptic weights are stored in a different (or same) memory array. Each weight can be represented by one or more resistive memory cells (e.g., memory elements). Bitmasks are presented in sequence. For example, driver 642 drives the bitmasks in sequence. For each cycle of this sequence, relevant bit lines(s) are enabled.

The size of the sequence depends on how many neurons have common connections. For example, if each of the neurons are common, then one sequence is presented for all bit lines (or data lines) in one cycle. In various embodiments, if optional data is provided (e.g., synaptic current for each word line, exact synaptic event time and the like) then each word line is driven according to the synaptic current strength and at the prescribed exact time value.

In some embodiments, signals driven on word lines can be encoded in various ways: pulses, frequencies, amplitudes (currents and voltages), shapes (e.g., saw tooth, ramp up-down), spikes, and so on. As stated above, sense amplifiers represent neuronal function. For example, sense amplifiers perform current integration on bit lines and solve and keep membrane potential dynamics, and detect when target neuron spikes (e.g., spikes 616). For better parallelism, neurons and associated bit lines can be split into multiple groups and multiplexed with a shared word line driver.

It should be appreciated that storing synaptic weights can also be done in the same array where matching occurs. For example, pre-synaptic neuron IDs are intermixed with weights. In such an example, the memory array will be performing dual functions: in a first set of cycles it will generate synaptic masks, and in the second set of cycles it will perform integration by feeding back the synaptic mask to itself (word lines) but targeting different bit lines (the ones that store the weight info). Those sets of cycles can be time-multiplexed and interleaved for better efficiency.

Figure 7:
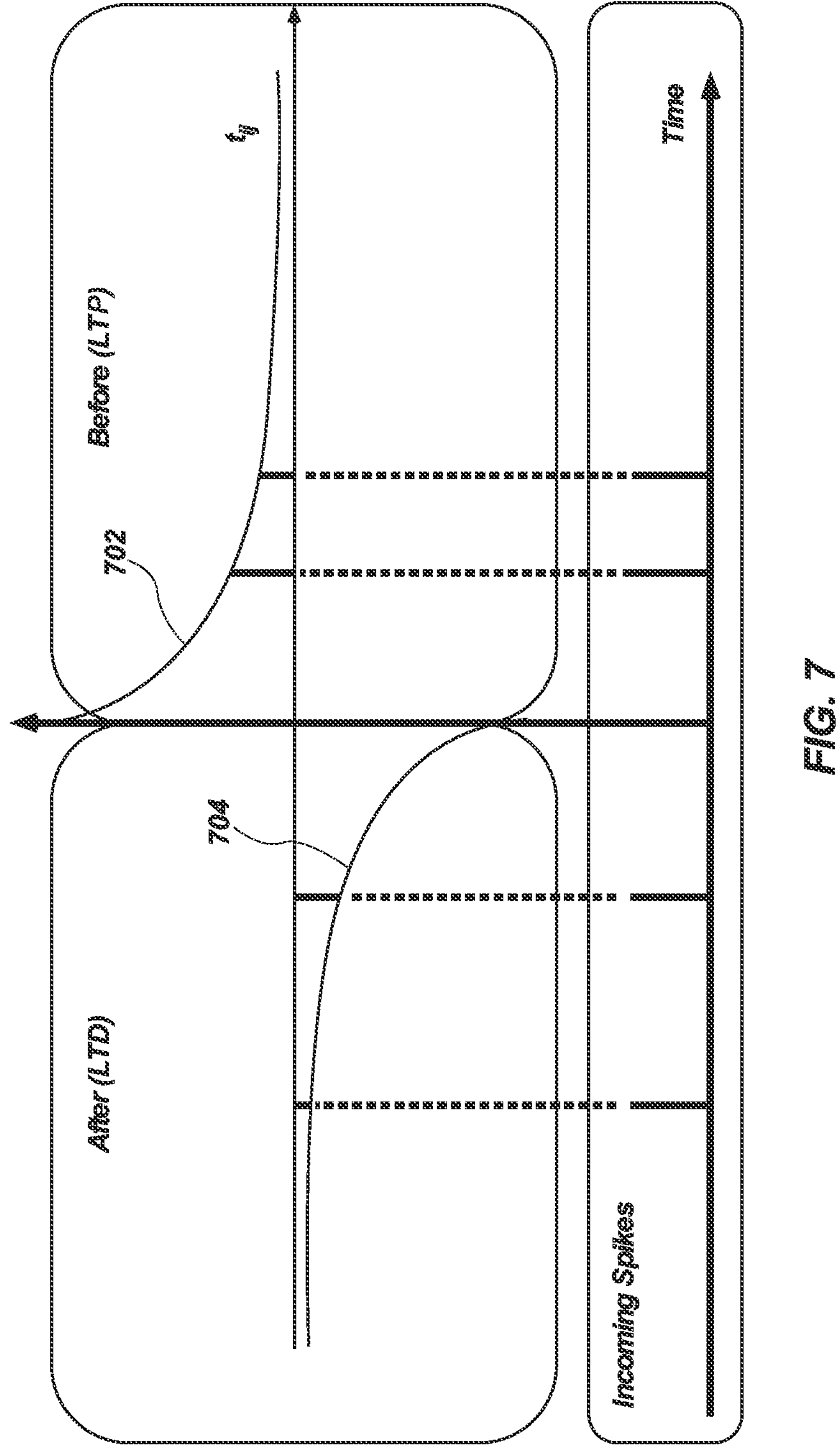
FIG. 7 illustrates a graph of a spike-timing-dependent plasticity (STDP) rule in a spiking neural network (SNN) according to various embodiments of the present disclosure.

FIG. 7 depicts an example graph 700 of STDP results in synapse weighting. The y-axis indicates synaptic weight (e.g., change of conductance) and the x-axis indicates time. The vertical line (between LTD and LTP) indicates a time that a post spike (e.g., a spike produced by a destination neuron) occurs. For a condition when a pre-synaptic spike arrived at its target synapse before the post-synaptic neuron generated a spike, the corresponding synaptic weight is increased, as illustrated in graph portion 702. This weight increase can be referred to as Long-Term Potentiation (LTP) of the synapse. It can be observed from the graph portion 702 that the amount of LTP may decrease roughly exponentially as a function of difference between pre-synaptic and post-synaptic spike times. In contrast, for a condition when a pre-synaptic spike arrived at its target synapse after the post-synaptic neuron generated a spike, the corresponding synaptic weight is decreased, as illustrated in graph portion 704. This weight decrease can be referred to as Long-Term Depression (LTD). It can be observed from the graph portion 704 that the amount of LTD may decrease roughly exponentially as a function of difference between pre-synaptic and post-synaptic spike times. As illustrated in FIG. 7, the synaptic weight-training curve may be asymmetrical. The LTP weight increment represented by portion 702 may be larger for short inter-spike intervals but may decay faster than the LTD weight intervals.

In various embodiments, for post-spike synaptic events arrived within the LTD window of exponential curve, the post-synaptic neuron spike time is known. Accordingly, the adjustment of synaptic conductance is readily determined based on the known post-synaptic neuron spike time. In various embodiments, for pre-spike synaptic events within the LTP window, the adjustment of synaptic conductance is a challenge because: (1) post-synaptic neuron spike time is unknown; (2) Every time interval can bring new pre-synaptic events, which may disturb membrane potential and impact spike time of the post-synaptic neuron (for excitatory synapses their pre-synaptic events facilitate post-synaptic neuron spike generation, for inhibitory synapses their pre-synaptic events delay post-synaptic neuron spike generation), and (3) time interval is on the order of 1 ms, whereas LTP window spans about 50 ms. Accordingly, the post-synaptic spike time is indeterministic until the target neuron actually spikes in the current time interval.

Biology resolves this issue at the intra-cellular level with neuromodulators, "second messengers" and receptors by opening "eligibility window" at every single synapse. This window decays in time in proportion to STDP rule: i.e., during first few microseconds the synapse is highly susceptible to a change should the target neuron spike and its potential wave back-propagates to the synapse. However, the actual synaptic conductance does not change without this back-propagated potential wave. Should another pre-synaptic event arrive before post-synaptic neuron spike it will add-on to the already opened "eligibility window."

In a computer-emulated or -simulated network, in various embodiments, to resolve the above stated issue, all or the most recent pre-synaptic events (i.e., their time stamps) for the time length of LTP window are stored, and then, once a post-synaptic neuron generates a spike, these events are replayed and synaptic conductance values are adjusted accordingly. In another embodiment, the above stated issue is resolved by implementing "eligibility window" features in the memory cells of a memory array.

Referring again to FIG. 6, a feedback path from the sense amplifiers is provided to respective bit lines. In one embodiment, the feedback path provides for a depression, according to the STDP rule, to resolve the issue of post-spike arriving pre-synaptic events.

Figure 8:
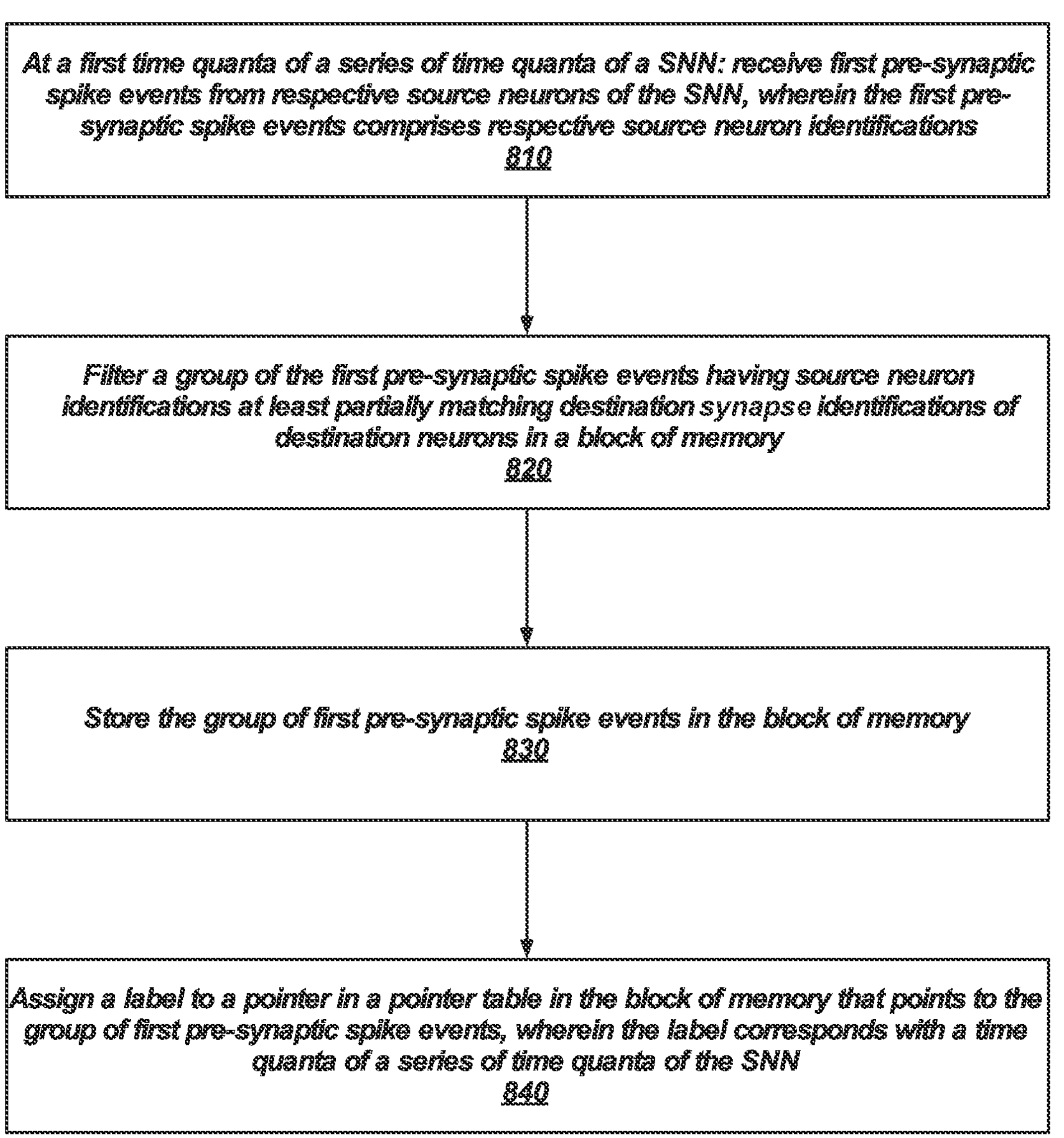
FIG. 8 is a flowchart of an example method of processing-in-memory spiking events, in accordance with various embodiments of the present disclosure.

FIG. 8 is a flowchart of a method 800 of assigning a label to a pointer that points to pre-synaptic spike events, in accordance with various embodiments of the disclosure. Method 800 may be arranged in accordance with at least one embodiment described in the present disclosure. Method 800 may be performed, in some embodiments, by a device or system, such as system 100 of FIG. 1, system 300 of FIG. 3, system 500 of FIG. 5, and/or system 600 of FIG. 6, or another device or system. Although illustrated as discrete blocks, various blocks may be divided into additional blocks, combined into fewer blocks, or eliminated, depending on the desired implementation.

At block 810 of method 800, at a first time interval of a series of time intervals of a SNN, first pre-synaptic spike events are received from respective source neurons of the SNN. The first pre-synaptic spike events comprise respective source neuron identifications. For example, referring to at least FIG. 3, at a first time interval (e.g., 1 ms), spikes 312 are received from source neurons (e.g., source neurons 210) of a SNN. In one embodiment, a pre-synaptic spike from each neuron includes a source neuron ID, such as an ID of source neuron 210-1, an ID of source neuron 210-2 and so on.

At block 820, a group of the first pre-synaptic spike events having source neuron identifications at least partially matching destination synapse identifications of destination neurons in a block of memory are filtered. For example, filter 320 determines whether source neuron IDs in spikes 312 match, at least in part, destination synapse IDs of neurons 330 (e.g., IDs of destination neurons 220). Upon determination of a match, filter 320 passes filtered spikes 314 into block 310.

At block 830, the group of first pre-synaptic spike events are stored in the block of memory. Upon determination of filtered spikes 314, filtered spikes 314 are stored in block 310, for example, in a resistive memory array of block 310. For example, referring to FIG. 5, spike events 520 (e.g., filtered spikes 314) are stored in block 310.

At block 840, a label is assigned to a pointer in a pointer table in the block of memory that points to the group of first pre-synaptic spike events. The label corresponds with a time interval of a series of time intervals of the SNN. For example, still referring to FIG. 5, pointer table 510 includes labels associated with pointers of spike events 520.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, in various embodiments, at each successive time interval, the labels in pointer table 510 are incremented to a successive time interval.

FIG. 9 is a flowchart of a method 900 of generating a bitmask of a matching of pre-synaptic spike events with synaptic connections, in accordance with various embodiments of the disclosure. Method 900 may be arranged in accordance with at least one embodiment described in the present disclosure. Method 900 may be performed, in some embodiments, by a device or system, such as system 100 of FIG. 1, system 300 of FIG. 3, system 500 of FIG. 5, and/or system 600 of FIG. 6, or another device or system. Although illustrated as discrete blocks, various blocks may be divided into additional blocks, combined into fewer blocks, or eliminated, depending on the desired implementation.

At block 910 of method 900, synaptic connections (i.e., synapses and their associated variables or values) of a destination neuron are stored at a first memory array, each of the synaptic connections include a delay value and an incoming neuron identification. Each of the synaptic connections are grouped together based on the delay value and wherein each of the delay values corresponds to a time interval in a series of time intervals of a SNN. For example, synapses 630 are stored in a memory array. Synapses of neurons 632 and 634 are grouped in buckets of time interval (e.g., 1 ms bucket, 2 ms bucket and so on). Each of the synapses of the neurons include an identification.

At block 920, pre-synaptic spike events from respective source neurons are stored at a second memory array. Each number of pre-synaptic spike events includes an incoming neuron identification, and the number of pre-synaptic spike events are grouped together by the time interval in a series of time intervals of the SNN. For example, referring to FIG. 6, spike events 620 are stored in buckets of time interval (e.g., 0 ms bucket, 1 ms bucket, 2 ms bucket and so on). Each of spike events 620 includes a time delay (e.g., corresponding time interval) and an incoming neuron ID (e.g., source neuron ID).

At block 930, the incoming neuron identifications of the synaptic connections of the destination neuron are matched with the incoming neuron identification of the source neurons at a first time interval. For example, spike events 620 of source neurons (having source neuron IDs) are matched with destination neuron IDs of synapses 630. This matching feature may be implemented by a filter similar to filter 320 (of filter 400).

At block 940, in response to the matching, an output signal is generated, at the second memory array, corresponding to a bitmask of synaptic events. For example, a bitmask of matched IDs of source neurons with IDs of destination synapses 614 are generated in response to the matching. In such an example, the bitmask(s) of destination synapses 614 are then sent to memory array 640 for driving on word lines via driver 642.

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 10:
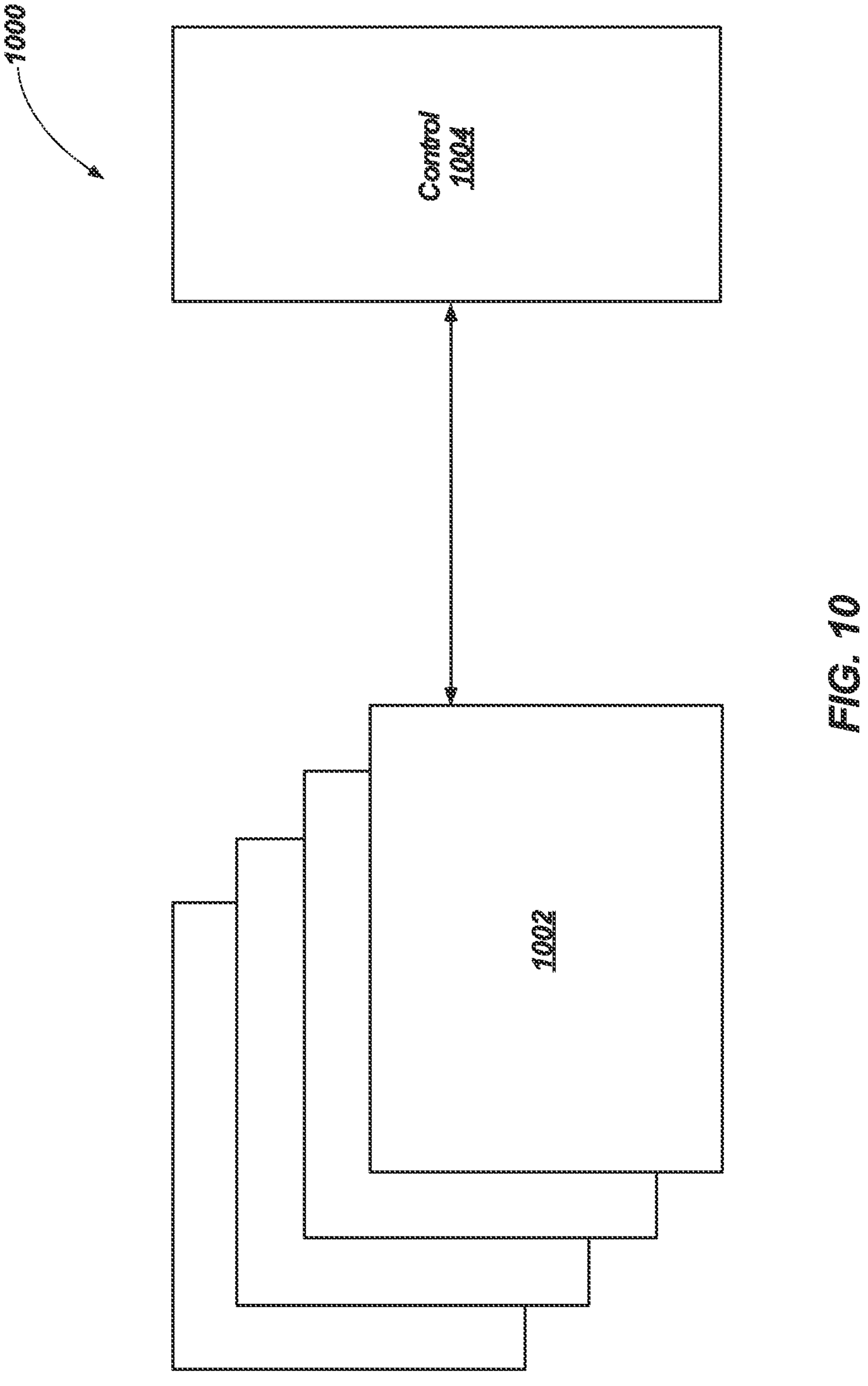
FIG. 10 is a simplified block diagram of an example memory system implemented according to one or more embodiments described herein.

FIG. 10 is a simplified block diagram of a memory system 1000 implemented according to one or more embodiments described herein. Memory system 1000 includes a memory module including a number of memory devices 1002 and a control logic component 1004. For example, memory devices 1002 may include memory device 120 and/or memory array 130 of FIG. 1, and/or block 310 of FIG. 3 and/or memory array 640 of FIG. 6 and control logic component 1004 may include controller 140 and/or host 111 of FIG. 1. Control logic component 1004 may be operatively coupled with the memory devices 1002 so as to read, write, or re-fresh any or all memory cells within memory devices 1002. Memory devices can be memory banks, memory arrays or subarrays, memory die, stacks and so on.

Figure 11:
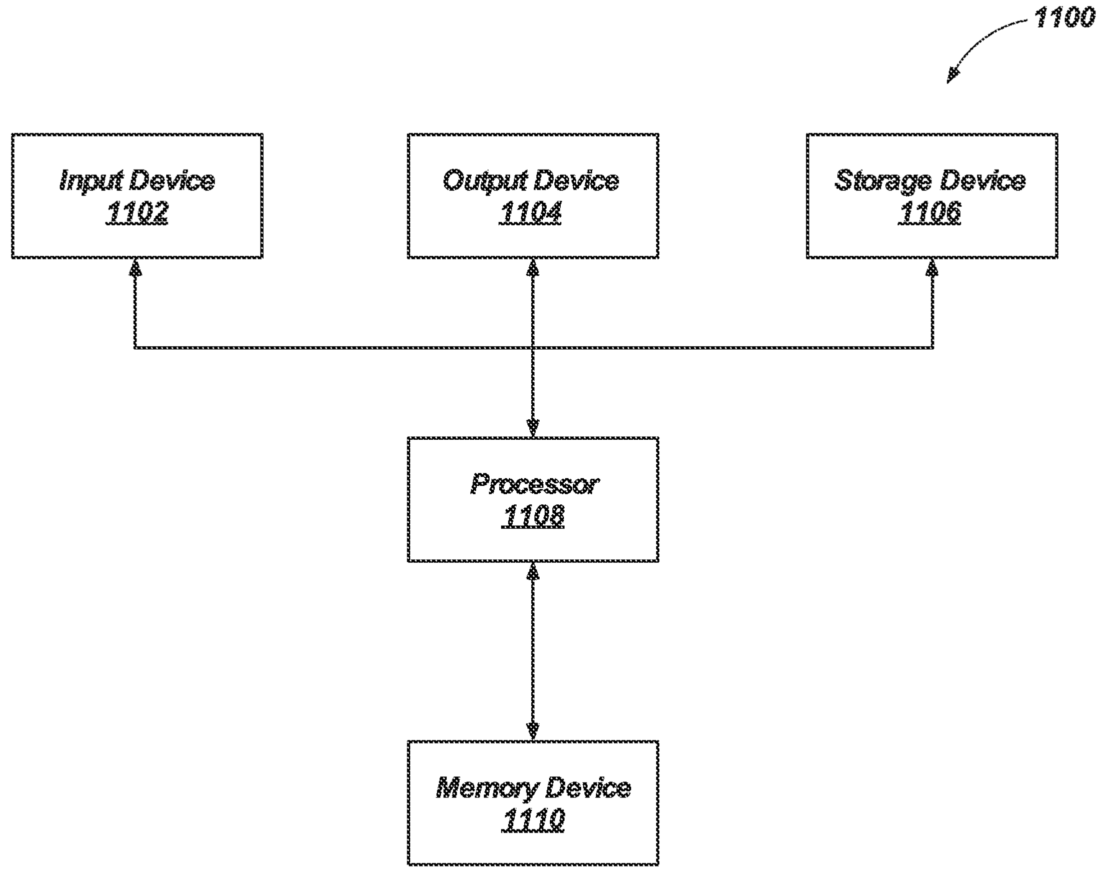
FIG. 11 is a simplified block diagram of an example electronic system implemented according to one or more embodiments described herein.

An electronic system is also disclosed. The electronic system may include memory system including a number of memory devices. FIG. 11 is a simplified block diagram of an electronic system 1100 implemented according to one or more embodiments described herein. Electronic system 1100 includes at least one input device 1102. Input device 1102 may be a keyboard, a mouse, or a touch screen. Electronic system 1100 further includes at least one output device 1104. Output device 1104 may be a monitor, touch screen, or speaker. Input device 1102 and output device 1104 are not necessarily separable from one another. Electronic system 1100 further includes a storage device 1106. Input device 1102, output device 1104, and storage device 1106 are coupled to a processor 1108.

Electronic system 1100 further includes a memory device 1110 coupled to processor 1108. Memory device 1110, which may include memory device 120 of FIG. 1 or memory system 1000 of FIG. 10. Electronic system 1100 may include a computing, processing, industrial, or consumer product. For example, without limitation, electronic system 1100 may include a personal computer or computer hardware component, a server or other networking hardware component, a handheld device, a tablet computer, an electronic notebook, a camera, a phone, a music player, a wireless device, a display, a chip set, a game, a vehicle, or other known systems.

According to various embodiments disclosed herein, and in contrast to some conventional devices, systems, and methods, data used in one or more PIM computations may be used to perform SNN spiking events. As a result, a number of reads from and/or writes to one or more memory arrays may be reduced, which may improve efficiency and/or speed of PIM operations and/or reduce latency associated with PIM operations.

One or more embodiments of the present disclosure include a system for processing spiking events. For example, a system may include a block of memory configured to store a group of destination neurons and a spike signal filter configured to, at each time interval in a series of time intervals of a SNN, pass through a group of pre-synaptic spike events from respective source neurons. The group of pre-synaptic spike events are subsequently stored in the block of memory. The block of memory is also configured to store a pointer table configured to store a pointer to each of the groups of pre-synaptic spike events stored in the block of memory, and increment labels, corresponding to each pointer, at each time interval in the series of time intervals.

According to another embodiment, a method of processing spiking events includes, at a first time interval of a series of time intervals of a SNN, receive first pre-synaptic spike events from respective source neurons of the SNN, wherein the first pre-synaptic spike events comprises respective source neuron identifications and filter a group of the first pre-synaptic spike events having source neuron identifications at least partially matching destination synapse identifications of destination neurons in a block of memory. The method also includes storing the group of first pre-synaptic spike events in the block of memory, and assigning a label to a pointer in a pointer table in the block of memory that points to the group of first pre-synaptic spike events, wherein the label corresponds with a time interval of a series of time intervals of the SNN.

In yet another embodiment, a system for processing spiking events may include a block of memory that includes a first memory array configured to store a number of incoming connections of a number of destination neurons, each of the number of incoming connections include a delay value and an incoming neuron identification, wherein each of the number of incoming connections are grouped together based on the delay value and wherein each of the delay values corresponds to a time interval in a series of time intervals of a spiking neural network (SNN). The block of memory may also include a second memory array configured to store a number of pre-synaptic spike events from respective source neurons, wherein each number of pre-synaptic spike events includes an incoming neuron identification, and the number of pre-synaptic spike events are grouped together by the time interval in a series of time intervals of the SNN. The block of memory may also include a filter configured to determine a match between an incoming neuron identification of a pre-synaptic spike event corresponding to a first time interval and an incoming neuron identification of an incoming connection corresponding to the first time interval.

According to another embodiment, a method of processing spiking events includes, storing synaptic connections of a destination neuron at a first memory array, each of the synaptic connections include a delay value and an incoming neuron identification, wherein each of the synaptic connections are grouped together based on the delay value and wherein each of the delay values corresponds to a time interval in a series of time intervals of a spiking neural network (SNN). The method may also include storing pre-synaptic spike events from respective source neurons at a second memory array, wherein each number of pre-synaptic spike events includes an incoming neuron identification, and the number of pre-synaptic spike events are grouped together by the time interval in a series of time intervals of the SNN. The method may also include matching the incoming neuron identifications of the synaptic connections of the destination neuron with the incoming neuron identification of the source neurons at a first time interval, and in response to the matching, generating an output signal, at the second memory array, corresponding to a bitmask of synaptic events.

According to a further embodiment, an electronic system comprises at least one input device, at least one output device, at least one processor device operably coupled to the input device and the output device and at least one memory device operably coupled to the at least one processor device. The at least one memory device comprises a memory cell array comprising a number of resistive elements configured to store synaptic weights, a driver configured to drive spiking events over a number of word lines coupled to the number of resistive elements at each time interval of a series of time intervals of a SNN and an integration circuit configured to integrate output voltage of bit lines coupled to the resistive elements.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

As used herein, the term "device" or "memory device" may include a device with memory, but is not limited to a device with only memory. For example, a device or a memory device may include memory, a processor, and/or other components or functions. For example, a device or memory device may include a system on a chip (SOC).

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A system, comprising:

memory configured to store a group of destination neurons, the memory including:

a filter configured to, at each time interval of a number of time intervals, pass through a group of spike events from respective source neurons in response to a determination that the group of spike events have source neuron identifications at least partially matching destination synapse identifications of respective destination neurons; and a pointer table including a label and configured to increment the label at each time interval of the number of timer intervals.

2. The system of claim 1, where the pointer table is configured to store a pointer to each group of spike events stored in the memory.

3. The system of claim 1, wherein the memory comprises a resistive memory array.

4. The system of claim 1, wherein the filter comprises a spike signal filter configured to pass through a group of pre-synaptic spike events from respective source neurons.

5. The system of claim 1, wherein the filter is further configured to at least one of:

determine a mismatch between a source neuron identification and a destination synapse identification based, at least, in part on a snapback event; and determine a match between the source neuron identification and the destination synapse identification based, at least, in part on the snapback event not occurring.

6. The system of claim 1, wherein the filter is further configured to match a sequence of bits transmitted over a series of word lines in the memory with a sequence of bits stored in the memory.

7. A method, comprising:

receiving spike events from respective source neurons;

filtering a group of the spike events in response to determining that the group of the spike events have source neuron identifications at least partially matching destination synapse identifications of destination neurons in memory; and incrementing a label to a pointer in a pointer table in the memory that points to the filtered group of the spike events.

8. The method of claim 7, further comprising storing the filtered group of the spike events in the memory.

9. The method of claim 7, further comprising:

receiving second spike events from respective source neurons; and filtering a group of second spike events having source neuron identifications at least partially matching destination synapse identifications of the destination neurons in the memory.

10. The method of claim 9, further comprising:

assigning, during a first time interval, the label to the pointer in a pointer table in the memory that points to the group of the spike events; and assigning, during a second time interval, a second label to a second pointer in the pointer table in the memory that points to the group of second pre-synaptic spike events.

11. The method of claim 7, further comprising at least one of:

determining a mismatch between the source neuron identifications and the destination synapse identifications based, at least, in part on a snapback event; and determining a match between the source neuron identifications and the destination synapse identifications based, at least, in part on the snapback event not occurring.

12. A system comprising:

a first memory array configured to store a number of incoming connections of a number of destination neurons;

a second memory array configured to store a number of pre-synaptic spike events from respective source neurons, wherein each pre-synaptic spike event includes an incoming neuron identification; and a filter configured to determine a match between the incoming neuron identification of the pre-synaptic spike event and an incoming neuron identification of an incoming connection.

13. The system of claim 12, further comprising at least one amplifier configured to generate a signal corresponding to a bitmask of the pre-synaptic spike event in response to the match.

14. The system of claim 13, the bitmask indicating a pre-synaptic spike event becoming a synaptic event.

15. The system of claim 12, further comprising:

a third memory array comprising:

a number of word lines;

a number of bit lines;

a number of resistive memory elements at an intersection of each number of word lines and each number of bit lines, wherein values of the number of resistive memory elements correspond to synaptic weights; and a driver configured to drive synaptic event signals on the number of word lines corresponding to a synaptic event.

16. The system of claim 15, further comprising:

integration circuitry configured to:

receive output signals from the number of bit lines;

determine a membrane potential of at least one destination neuron of the number of destination neurons based, at least in part on, integration of the synaptic event signals and the synaptic weights; and in response to the membrane potential meeting a spike threshold, generate a spike signal.

17. The system of claim 16, wherein the integration circuitry is further configured to:

in response to the pre-synaptic spike event arriving at the destination neuron before the spike signal of the destination neuron, generate a feedback signal to a bit line to increase a conductance of the synaptic weights according to a spike timing dependent plasticity (STDP) rule; and in response to the pre-synaptic spike event arriving at the destination neuron after the spike signal of the destination neuron, generate a feedback signal to a bit line to decrease a conductance of the synaptic weight according to the STDP rule.

18. The system of claim 14, wherein the filter is configured to determine the match between the incoming neuron identification of the pre-synaptic spike event and the incoming neuron identification of the incoming connection corresponding to a time interval of a series of time intervals of a spiking neural network (SNN).

* * * * *